US012579970B2

(12) United States Patent
Pawani et al.

(10) Patent No.: US 12,579,970 B2
(45) Date of Patent: Mar. 17, 2026

(54) DEVICE, SYSTEM AND METHOD FOR RETRAINING A MICROPHONIC NOISE COMPENSATION MODEL

(71) Applicant: MOTOROLA SOLUTIONS, INC., Chicago, IL (US)

(72) Inventors: Jeet K. Pawani, Sunrise, FL (US); Lee M. Proctor, Cary, IL (US); Rajesh Baliram Singh, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 205 days.

(21) Appl. No.: 18/656,181

(22) Filed: May 6, 2024

(65) Prior Publication Data

US 2025/0342824 A1    Nov. 6, 2025

(51) Int. Cl.
G10L 15/06        (2013.01)
G10L 21/0216      (2013.01)

(52) U.S. Cl.
CPC ........ G10L 15/063 (2013.01); G10L 21/0216 (2013.01)

(58) Field of Classification Search
CPC ............... G10L 15/063; G10L 21/0208; G10L 21/0216
See application file for complete search history.

(56) References Cited

U.S. PATENT DOCUMENTS 8,036,716 B2    10/2011  Dunn et al.
11,606,650 B2    3/2023  Fitz et al.

| | | |
|---|---|---|
| 11,736,063 B2 | 8/2023 | Petrovic et al. |
| 2022/0215853 A1 | 7/2022 | Zhang et al. |
| 2024/0046946 A1* | 2/2024 | Yang ................... G10L 21/0208 |
| 2025/0168548 A1 | 5/2025 | Pawani et al. |

FOREIGN PATENT DOCUMENTS

| | | |
|---|---|---|
| CN | 115243162 A | 10/2022 |
| KR | 102130505 B1 | 7/2020 |
| WO | 2023086311 A1 | 5/2023 |

* cited by examiner

*Primary Examiner* — David L Ton

(74) *Attorney, Agent, or Firm* — PERRY + CURRIER INC. (FOR MSI)

(57)                ABSTRACT

A computing device: receives, from a communication device at which microphonic noise is occurring: a microphonic indicator indicating a type of the microphonic noise; and audio sample(s) that include the microphonic noise; and selects, using the indicator, a microphonic noise compensation model pretrained for compensating for the type of the microphonic noise. The computing device retrains, using the audio sample(s) that include the microphonic noise, the compensation model to compensate for the type of the microphonic noise, and applies the compensation model, as retrained, to at least one of: further audio sample(s) received from the communication device that include the microphonic noise; and an audio test set that includes the type of the microphonic noise. When the compensation model compensates for the microphonic noise in at least one of the further audio sample(s) and the audio test set, the compensation model, as retrained, is deployed to the communication device.

20 Claims, 17 Drawing Sheets

100

102

DEVICE, SYSTEM AND METHOD FOR RETRAINING A MICROPHONIC NOISE COMPENSATION MODEL

BACKGROUND OF THE INVENTION

Communication devices for first responders, such as land-mobile radios (LMRs), may emit audio via a speaker. Such communication devices generally include a radio-frequency (RF) mixer and a voltage-controlled oscillator (VCO) which convert audio signals received, via a receiver, into audio of a format suitable for processing by an audio processor, such as a digital signal processor (DSP). However, first responders may operate the communication devices at volumes such that processed audio output by a speaker causes vibrations at the VCO, which may translate into noise introduced into the audio output from the RF mixer. Such noise is referred to as microphonic noise and generally manifests as a howling sound output by the speaker, which may, in turn, cause more vibrations at the VCO, increasing the microphonic noise in a feedback loop. Such microphonic noise may obscure audio output by the speaker, such that a first responder operating the communication device may not hear mission critical information.

While microphonic noise compensation models may be deployed at such communication devices to compensate for the microphonic noise, the microphonic noise may change over time and such microphonic noise compensation models deployed at such communication devices may eventually no longer be able to compensate for the microphonic noise. Alternatively, or in addition, settings of a communication device (e.g. such as volume settings, equalizer settings, and the like) may make it challenging for such microphonic noise compensation models to compensate for microphonic noise.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
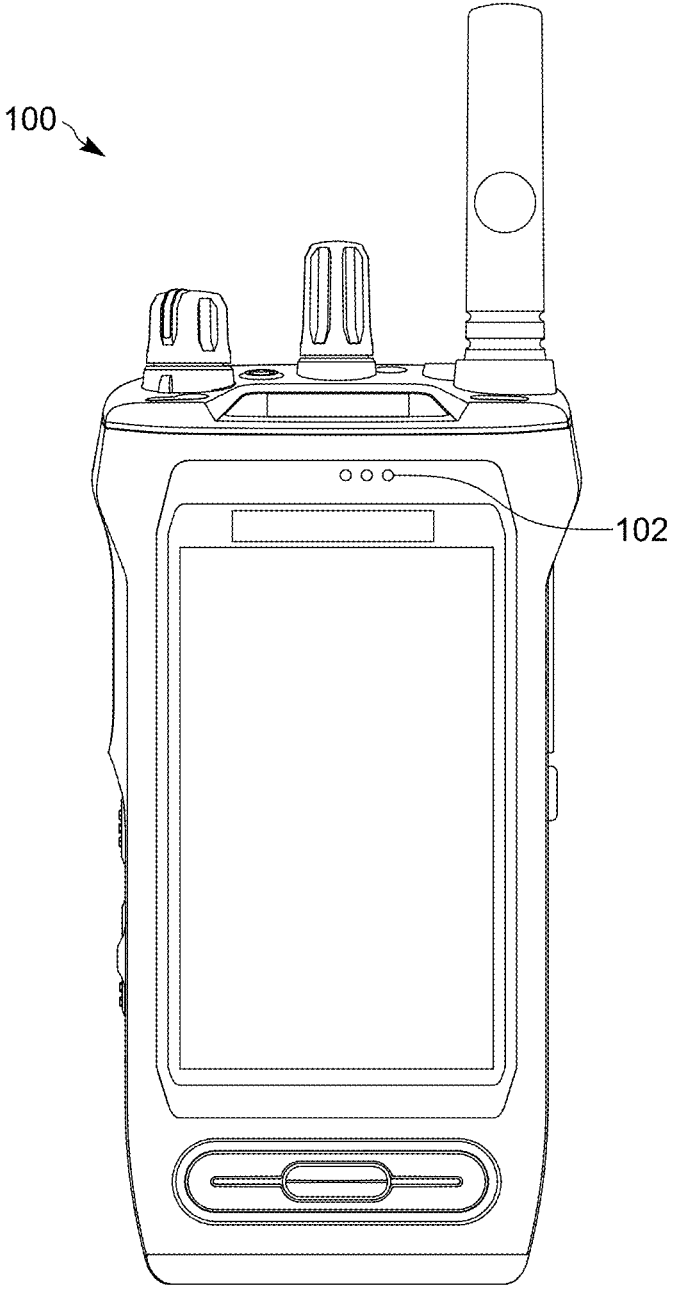
FIG. 1 is a device for microphonic noise compensation, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

While microphonic noise at a communication device may be compensated using a microphonic noise compensation model implemented, for example, by a microphonic compensation engine at the communication device, over time the microphonic noise may change, and the microphonic noise compensation model and/or the microphonic compensation engine may no longer adequately compensate for the microphonic noise. Alternatively, or in addition, settings of a communication device (e.g. such as volume settings, equalizer settings, and the like) may make it challenging for such microphonic noise compensation models to compensate for microphonic noise. Thus, there exists a need for an improved technical method, device, and system for retraining a microphonic noise compensation model.

Hence, provided herein is a device, system, and method for microphonic noise compensation model. In particular a computing device is provided which is in communication with a communication device at which microphonic noise is occurring. The communication device is understood to be implementing one or more microphonic noise compensation models, for example via a microphonic compensation engine, to compensate for microphonic noise. The microphonic noise compensation model implemented by the communication device may depend on a type of the microphonic noise (e.g. such as different amplitudes of the microphonic noise), with the communication device implementing different microphonic noise compensation models depending on the type of the microphonic noise. However, the microphonic noise compensation model implemented by the communication device may be insufficient to compensate for the microphonic noise.

As such, the communication device may provide, to the computing device, a microphonic indicator indicating a type of the microphonic noise that is occurring at the communication device, and one or more audio samples that include the microphonic noise. For example, the microphonic noise may be of a first type or a second type, and the microphonic indicator indicates the first type or the second type, with the type depending on an amplitude of the microphonic noise.

The computing device may select, using the microphonic indicator, a microphonic noise compensation model pretrained for compensating for the type of the microphonic noise. For example, the computing device may maintain copies of the microphonic noise compensation models implemented by the communication device, and select a microphonic noise compensation model accordingly using the microphonic indicator.

The computing device may retrain, using the one or more audio samples that include the microphonic noise, the selected microphonic noise compensation model to compensate for the type of the microphonic noise. For example, the microphonic noise compensation model may comprise a machine learning model that may be placed in a training mode for such retraining. In particular, the computing device may select a subset of the one or more audio samples in which voice data is absent, but the microphonic noise is included, as training input for the machine learning model, and use corresponding training output comprising one or more audio samples that are silent and/or exclude voice data and microphonic noise.

Once the microphonic noise compensation model is retrained, to test the microphonic noise compensation model as retrained, the computing device places the microphonic noise compensation model into a normal and/or operational mode, and applies the microphonic noise compensation model, as retrained, to at least one of: one or more further audio samples received from the communication device that include the microphonic noise; and an audio test set that includes the type of the microphonic noise. Such a test may hence be performed on one or more further audio samples that include the microphonic noise, received from the communication device, that were not used in retraining the microphonic noise compensation model, and/or such a test may be performed on an audio test set that comprises audio samples that include the type of the microphonic noise, and that may be preconfigured at the computing device.

When the microphonic noise compensation model compensates for the microphonic noise in at least one of the one or more further audio samples and the in audio test set, the computing device deploys the microphonic noise compensation model, as retrained, to the communication device, and the communication device replaces the current microphonic noise compensation model being implemented for the associated type of microphonic noise, with the microphonic noise compensation model, as retrained.

Hence, in general, the computing device retrains the microphonic noise compensation model to remove the microphonic noise from audio samples and outputs silence in the absence of voice data, and/or outputs audio in which microphonic noise is reduced to below a given level, such as below −6 dB, and the like. Similarly, when audio samples that include voice data and microphonic noise are input to the microphonic noise compensation model as retrained, the output may comprise the voice data with the microphonic noise removed and/or reduced to below a given level.

However, when the microphonic noise compensation model fails to compensate for the microphonic noise, the computing device may generally not deploy the microphonic noise compensation model, as retrained, to the communication device. Rather, the computing device may determine given audio settings for a respective type of the communication device that reduces or eliminates at least the type of the microphonic noise, for example as received from other communication devices of the same respective type as the communication device from which the audio sample were received, and transmits, to the communication device, one or more of: a warning that current audio settings at the communication device may be causing the microphonic noise; an indicator of the given audio settings that reduces or eliminates at least the type of the microphonic noise; and installation data for automatic installation of the given audio settings.

An aspect of the present specification provides a method comprising: receiving, at a computing device, from a communication device at which microphonic noise is occurring: a microphonic indicator indicating a type of the microphonic noise; and one or more audio samples that include the microphonic noise; selecting, via the computing device, using the microphonic indicator, a microphonic noise compensation model pretrained for compensating for the type of the microphonic noise; retraining, via the computing device, using the one or more audio samples that include the microphonic noise, the microphonic noise compensation model to compensate for the type of the microphonic noise; applying, via the computing device, the microphonic noise compensation model, as retrained, to at least one of: one or more further audio samples received from the communication device that include the microphonic noise; and an audio test set that includes the type of the microphonic noise; and when the microphonic noise compensation model compensates for the microphonic noise in at least one of the one or more further audio samples and the audio test set, deploying, via the computing device, the microphonic noise compensation model, as retrained, to the communication device.

Another aspect of the present specification provides a computing device comprising: a communication interface; a controller; and a computer-readable storage medium having stored thereon program instructions that, when executed by the controller, cause the controller to perform a set of operations comprising: receiving, via the communication interface, from a communication device at which microphonic noise is occurring: a microphonic indicator indicating a type of the microphonic noise; and one or more audio samples that include the microphonic noise; selecting, using the microphonic indicator, a microphonic noise compensation model pretrained for compensating for the type of the microphonic noise; retraining, using the one or more audio samples that include the microphonic noise, the microphonic noise compensation model to compensate for the type of the microphonic noise; applying, the microphonic noise compensation model, as retrained, to at least one of: one or more further audio samples received from the communication device that include the microphonic noise; and an audio test set that includes the type of the microphonic noise; and when the microphonic noise compensation model compensates for the microphonic noise in at least one of the one or more further audio samples and the audio test set, deploying, via the communication interface, the microphonic noise compensation model, as retrained, to the communication device.

Each of the above-mentioned embodiments will be discussed in more detail below, starting with example system and device architectures of the system in which the embodiments may be practiced, followed by an illustration of processing blocks for achieving an improved technical method, device, and system for retraining a microphonic noise compensation model.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Herein, reference will be made to engines, which may be understood to refer to hardware, and/or a combination of hardware and software (e.g., a combination of hardware and software includes software hosted at hardware such that the software, when executed by the hardware, transforms the hardware into a special purpose hardware, such as a software module that is stored at a processor-readable memory implemented or interpreted by a processor), or hardware and software hosted at hardware and/or implemented as a system-on-chip architecture and the like.

Further advantages and features consistent with this disclosure will be set forth in the following detailed description, with reference to the drawings.

Prior to discussing retraining a microphonic noise compensation model, functionality of a communication device at which microphonic noise is occurring is described, and how such a communication device compensates for the microphonic noise. In particular, attention is directed to FIG. 1 and FIG. 2 that respectively depict a perspective view, and a block diagram, of a communication device 100 comprising a speaker 102 and which performs microphonic noise compensation as described herein. The communication device 100 is interchangeably referred to hereafter as the device 100.

As depicted in FIG. 1, the device 100 comprises a mobile radio adapted for use by first responders, and the like, and may specifically comprise one or more of a land mobile radio (LMR), a digital mobile radio (DMR), a two-way radio, a first responder radio, and the like, amongst other possibilities, and/or any other suitable communication device for assisting first responders in responding to incidents.

However, the device 100 may comprise any suitable portable device, partially portable device, and/or non-portable device that includes a receiver (e.g. and an RF mixer/voltage-controlled oscillator (VCO) combination) and a speaker. In particular examples, the device 100 may comprise any suitable mobile communication device, any suitable portable device, cell phone, a radio, a body-worn camera (e.g., with audio functionality), a remote speaker microphone (RSM), a first responder device, a laptop computer, a headset, and the like, and/or any device that includes a microphone and provides audio data to an output device, as described herein.

Figure 2:
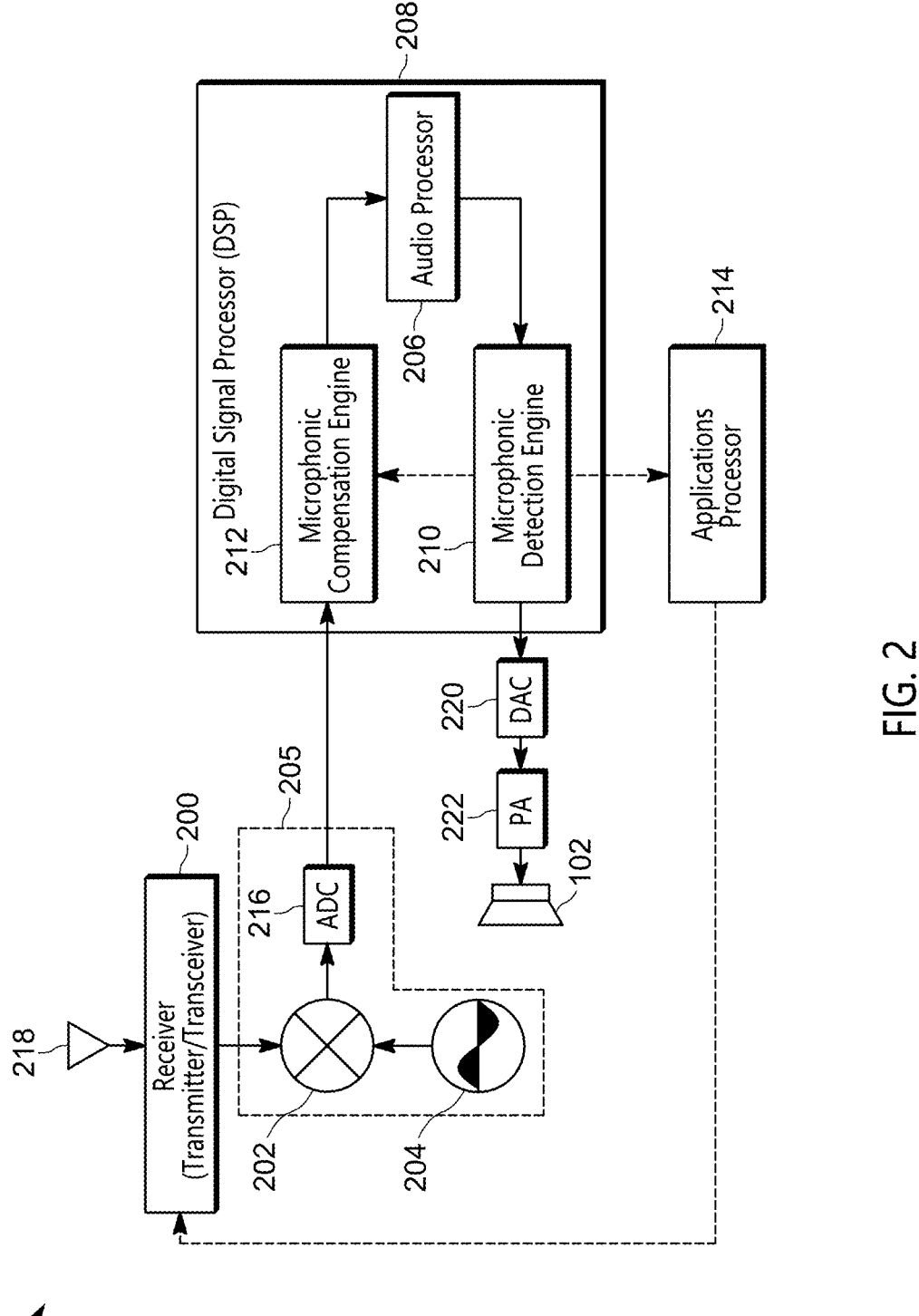
FIG. 2 is a device diagram showing a device structure of the device for microphonic noise compensation, in accordance with some examples.

With reference to FIG. 2, the device 100 comprises: the speaker 102; a receiver 200 (e.g., which, as depicted, may be provided with a transmitter and/or as a transceiver and hence may alternatively be referred to herein as a receiver/transceiver 200 and/or a receiver/transmitter 200), an RF mixer 202 and a VCO 204 (e.g., which, as depicted, may be components of an RFIC 205); an audio processor 206 (e.g. which may implemented at a digital signal processor (DSP) 208 and/or as a component of the DSP 208); a microphonic detection engine 210; a microphonic compensation engine 212; and an applications processor 214. While the microphonic detection engine 210 and the microphonic compensation engine 212 are depicted as components of the DSP 208, one or more of the microphonic detection engine 210 and the microphonic compensation engine 212 may be implemented separate from the DSP 208 and/or one or more of the microphonic detection engine 210 and the microphonic compensation engine 212 may be implemented by the applications processor 214.

The device 100 further comprises, as depicted, an analog-to-digital converter (ADC) 216, an antenna 218, a digital-to-analog converter (DAC) 220 and an audio power amplifier 222. The ADC 216 may, as depicted, be a component of the RFIC 205, and generally converts analog audio (e.g. audio received by the receiver 200), output by the RF mixer 202, to digital audio. The DAC 220 generally converts digital processed audio to analog audio for output by the speaker 102 as sound, and the audio power amplifier 222 amplifies the analog audio output by the DAC 220 to power levels suitable for driving the speaker 102.

While not expressly depicted, the device 100 may further comprise any other suitable components including, but not limited to any suitable combination of read-only memory (ROM), random-access memory (RAM), modulators, demodulators, input/output interfaces, and the like. Such a memory may comprise a computer-readable storage medium having stored thereon program instructions that, when executed by the microphonic detection engine 210 and the microphonic compensation engine 212, cause the microphonic detection engine 210 and the microphonic compensation engine 212 to perform respective sets of operations comprising the blocks of the method of FIG. 3. Such a computer-readable storage medium and program instructions are understood to be represented in FIG. 2 as a component of one or more of the engines 210, 212, and the DSP 208, however such a computer-readable storage medium and program instructions may be separate from, but accessible to, the engines 210, 212, and the DSP 208.

The receiver 200, and/or a transceiver that combines the receiver 200 and a transmitter, may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network.

Hence, a transceiver that combines the receiver 200 and a transmitter may include one or more transceivers that may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The processors 206, 214 may include one or more logic circuits, one or more processors, one or more microprocessors, one or more GPUs (Graphics Processing Units), and/or the processors 206, 214 may include one or more ASIC (application-specific integrated circuits) and one or more FPGA (field-programmable gate arrays), and/or another electronic device.

The device 100 may further comprise any suitable combination of input devices and/or output devices, which may include, but is not limited to, buttons, a keyboard, a pointing device, a display screen, a touch screen, and the like.

Communication links between components of the device 100 are depicted in FIG. 2 as arrows, with directionality of audio and/or data flow indicated by directionality of the arrows. Furthermore, an audio path of the device 100 is indicated by solid arrows, data communication between the microphonic detection engine 210, the microphonic compensation engine 212 and the applications processor 214 is depicted with arrows having a shorter dash, and data communication between the applications processor 214, the receiver/transceiver 200 and the antenna 218 is depicted with arrows having a longer dash. Such distinctions are provided for clarity, to show types of data being processed at the device 100.

In general, the device 100 receives wireless audio signals, via the antenna 218 and the receiver 200, which are converted to audio of a format processable by the audio processor 206 at least via the VCO 204 providing a waveform to the RF mixer 202, and the pitch of the waveform is modulated via the RF mixer 202 based on the received wireless audio signal. In particular, the combination of the RF mixer 202 and the VCO 204 may convert audio signals from a MHz and/or GHz range to a kHz range, and the ADC 216 may convert the audio signals to digital audio.

Such audio (e.g. in a digital format, and downmixed to the kHz range) is provided to the audio processor 206, which processes the audio, and outputs processed audio, for conversion by the DAC 220 and the audio power amplifier 222 into a format suitable for playing by the speaker 102.

Generally, the audio processor 206 may be configured to: process audio received via the receiver 200; and output processed audio to the speaker 102 (e.g. via the DAC 220 and the audio power amplifier 222). For example the audio processor 206 may perform any suitable functionality on the audio, including, but not limited to, audio leveling, tier gaining, and the like. Audio leveling increases or reduces audio levels to predetermined levels commensurate with human hearing and/or levels that have been heuristically determined to be preferred by humans. Tier gaining may adjust overall volume of audio to a predetermined maximum volume level (e.g. but which may be adjusted as described herein).

As depicted, the speaker 102 may be positioned to output sound in a direction of the VCO 204, which may introduce microphonic noise into the audio output by the receiver 200. For example, due to the sound of the speaker 102, the VCO 204 outputs both a predetermined waveform the VCO 204 used by RF mixer 202, and noise due to vibration of the VCO 204 by the sound.

The microphonic detection engine 210 is configured to search for microphonic noise in the processed audio from the audio processor 206 according to one or more predetermined microphonic parameters. The one or more predetermined microphonic parameters may be heuristically determined at a factory, for example by measuring microphonic noise in an example device, similar to the device 100, to determine characteristics of such microphonic noise, such as a frequency and/or frequencies thereof, and levels and/or ranges thereof.

Alternatively, or in addition, the one or more predetermined microphonic parameters may be indicative of one or more predetermined microphonic audio data sets combined with one or more clean audio samples. For example, at the factory, microphonic noise may be measured and stored as one or more microphonic audio data sets, and the one or more microphonic audio data sets may be combined with clean audio samples representing audio output by audio processor 206 when no audio signal is being received at the receiver.

The microphonic detection engine 210 hence searches for such one or more predetermined microphonic parameters in the processed audio.

When the microphonic noise is detected, the microphonic detection engine 210 outputs a microphonic indicator to the microphonic compensation engine 212 to cause the microphonic compensation engine 212 to compensate for the microphonic noise in the audio received via the receiver 200. Output of the microphonic indicator to the microphonic compensation engine 212 may occur via the communication link indicated via the short dash arrow therebetween, depicted in FIG. 2.

The microphonic indicator may indicate a level of the microphonic noise and/or a range in which a level of the microphonic noise is located, for example in decibels. For example, when the microphonic noise is –5 dB, the microphonic indicator may indicate "–5 dB", or the microphonic indicator may indicate that the microphonic noise is in a range of "–4 dB to –6 dB", and the like, amongst other possibilities. The microphonic indicator may alternatively indicate a frequency and/or frequencies of the microphonic noise.

However, in some examples, the microphonic indicator may more simply comprise a flag and/or value, of a plurality of flags or values, that correspond to different ranges of microphonic noise. For example, a flag and/or value of "0" may indicate microphonic noise in a range of "greater than 0 dB", a flag and/or value of "1" may indicate microphonic noise in a range of "0 dB to –2 dB", a flag and/or value of "2" may indicate microphonic noise in a range of "–2 dB to –4 dB", a flag and/or value of "3" may indicate microphonic noise in a range of "–4 dB to –6 dB", and a flag and/or value of "4" may indicate microphonic noise in a range of "less than –6 dB". As microphonic noise less than –6 dB may not be detectable and/or may not result in the aforementioned howling sound, a flag and/or value of "4" may indicate no microphonic noise and/or no microphonic noise detected.

However, any suitable number of flags or values or ranges of microphonic noise is within the scope of the present specification.

The microphonic compensation engine 212 is configured to: receive the microphonic indicator; and responsively compensate for the microphonic noise in the audio received via the receiver 200, prior to processing of the audio by the audio processor 206.

For example, when the microphonic indicator specifically indicates a level (and/or frequency and/or frequencies of the microphonic noise), the microphonic compensation engine 212 may specifically subtract a signal from the audio received via the receiver 200 that corresponds to such a level (and/or frequency and/or frequencies) of microphonic noise. Such a subtraction may occur after such audio is downmixed to a kHz range and digitized. Indeed, any operations on audio by the DSP 208, etc., as described herein, are understood to occur at frequencies after audio is downmixed to a kHz range and digitized, except where otherwise indicated.

However, when the microphonic indicator specifically indicates a range of microphonic noise (e.g. which may be flag and/or value based), the microphonic compensation engine 212 may subtract a signal from the audio received via the receiver 200 that corresponds to microphonic noise in such a range.

For example, using the aforementioned flags, when the microphonic indicator comprises a flag of "1", and/or a range of "0 dB to –2 dB", the microphonic compensation engine 212 may subtract a signal from the audio received via the receiver 200 that corresponds to microphonic noise in this range, and/or microphonic noise in a middle of this range, or "–1 dB", for example at a predetermined frequency and/or frequencies (e.g. as measured at the aforementioned factory).

Similarly, when the microphonic indicator comprises a flag of "2", and/or a range of "–2 dB to –4 dB", the microphonic compensation engine 212 may subtract a signal from the audio received via the receiver 200 that corresponds to microphonic noise in this range, and/or microphonic noise in a middle of this range, or "–3 dB", for example at a predetermined frequency and/or frequencies (e.g. as measured at the aforementioned factory).

Similarly, when the microphonic indicator comprises a flag of "3", and/or a range of "–4 dB to –6 dB", the microphonic compensation engine 212 may subtract a signal from the audio received via the receiver 200 that corresponds to microphonic noise in this range, and/or microphonic noise in a middle of this range, or "–5 dB", for example at a predetermined frequency and/or frequencies (e.g. as measured at the aforementioned factory).

However, when the microphonic indicator comprises a flag of "4", and/or a range of "less than –6 dB", the microphonic compensation engine 212 may take no action as such a flag and/or range may indicate that no microphonic noise is detected.

Conversely, when the microphonic indicator comprises a flag of "0", and/or a range of "greater than 0 dB", the microphonic compensation engine 212 may not be able to compensate for microphonic noise and/or the microphonic compensation engine 212 may attempt to compensate for microphonic noise using highest available compensation parameters (e.g. as used with a flag of "1"), and if such compensation fails to reduce the microphonic noise to values of less than 0 dB, the microphonic compensation engine 212 may implement any suitable action to reduce volume of sound output by the speaker 102.

Alternatively, or in addition, when any compensation of microphonic noise occurring at the microphonic compensation engine 212 fails to reduce the microphonic noise to below a given level (e.g. –4 dB, –5 dB, –6 dB, amongst other possibilities), and the like, the microphonic compensation engine 212 may implement any suitable action to reduce volume of sound output by the speaker 102.

For example, the microphonic compensation engine 212 may reduce volume of the audio received via the receiver 200, in addition to performing the aforementioned compensation, and/or the microphonic compensation engine 212 may control the audio power amplifier 222 to reduce power of the analog processed audio to be output by the speaker 102, and/or the microphonic compensation engine 212 may control the audio processor 206 to reduce power of the processed audio output to the microphonic detection engine 210, and the like.

Hence, while in FIG. 2 the microphonic compensation engine 212 is depicted as being in communication only with the microphonic detection engine 210, and with the RF mixer 202 and the audio processor 206 on the audio path, the microphonic compensation engine 212 may be in communication with any suitable components of the device 100, to control such components to reduce volume of sound output by the speaker 102.

Indeed, while not depicted, suitable components of the device 100 may be in communication via a common bus.

Furthermore, the microphonic detection engine 210 and the microphonic compensation engine 212 may continue to respectively detect and compensate for the microphonic noise in a feedback loop, and, with each instance of the feedback loop where the microphonic noise continues to be detected, the microphonic detection engine 210 may reduce volume of sound emitted by the speaker 102, for example until a predetermined minimum volume is reached, which may be heuristically determined.

Furthermore, such a predetermined minimum volume may be indicated in any suitable manner, such as a minimum volume of audio input to the audio processor 206, a minimum volume of processed audio output by the audio processor 206, and/or a minimum power setting of the audio power amplifier 222. In particular, such a predetermined minimum volume may comprise a volume at which sound emitted by the speaker 102 is distinguishable, by an average listener, from background noise of a given volume, for example as determined heuristically and/or from known human factors parameters and/or standards.

In some examples, when microphonic noise in the compensated processed audio continues to be detected or is no longer detected, by the microphonic detection engine 210, the device 100 may provide, via a transmitter of the receiver/transceiver 200, to an external computing device, a respective notification thereof. For example, as depicted, microphonic detection engine 210 may provide the microphonic indicator to the applications processor 214, which may transmit the microphonic indicator in a notification, and the like, to an external computing device via the transmitter (e.g. via the long dash communication links, for example see FIG. 7).

Indeed, the microphonic indicator and/or notification may be provided to the external computing device when any microphonic noise is detected. Alternatively, or in addition, the notification may indicate whether microphonic noise was resolved (e.g. via compensation and/or noise reduction), or resolved.

The external computing device (not depicted in FIG. 2, however see FIG. 7) may comprise any suitable computing device which may be associated with an entity tasked with monitoring functionality of the device 100 (e.g. and other similar communication devices). For example, the external computing device may be operated by an entity which manages the device 100 (e.g. and other communication devices), such as a first responder entity. The microphonic indicator may indicate that the device 100 is functioning (e.g. when the flag is "1" or higher) or not functioning (e.g. when the flag is "0" and/or remains at "0" after microphonic noise compensation and volume reduction). When the device 100 is not functioning, the external entity may recall the device 100. Alternatively, or in addition, when the device 100 is not functioning and/or the microphonic noise was not resolved, a development team associated with the entity may take any suitable remedial action to resolve the microphonic noise, for example once the device 100 is recalled. For example, the engines 210, 212 may need recalibrating, and/or retraining, and/or other components on the audio path may require repair.

Examples of retraining of the microphonics compensation engine 212 is described with respect to FIG. 8 to FIG. 17.

Returning to the engines 210, 212, functionality of the engines 210, 212 may be implemented using numerical algorithms and/or machine learning algorithms.

For example, one or more machine learning algorithms of the microphonic detection engine 210 may be trained to detect microphonic noise as described herein, and one or more machine learning algorithms of the microphonic compensation engine 212 may be trained to compensate for microphonic noise as described herein.

Such machine learning algorithms may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, any suitable machine learning algorithms and/or deep learning algorithms and/or neural networks are within the scope of present examples.

In particular, at the factory, such one or more machine learning algorithms, in the form of microphonic noise compensation models (e.g. machine learning models, and the like) may be operated in a training mode to train the one or more machine learning algorithms to search for microphonic noise or compensate for microphonic noise. Such training may occur at the device 100 or another similar device, or at the aforementioned external computing device. When the training occurs using another similar device, or at the aforementioned external computing device, respective machine learning parameters, such as classifiers, machine learning models, and the like, may be provided to the one or more machine learning algorithms of the engines 210, 212 to implement respective functionality thereof.

In a particular example, the microphonic compensation engine 212 may implement one or more microphonic noise compensation models to compensate for microphonic noise. For example, as has been previously described, a microphonic indicator (e.g. a flag) of 0, 1, 2, 3 and 4 may be generated by the microphonic detection engine 210 to indicate a level of the microphonic noise and/or a range in which a level of the microphonic noise is located. Put another way, the microphonic indicator may indicate a type of microphonic noise that is detected. Furthermore, the microphonic compensation engine 212 and compensates for the type and/or amplitude of microphonic noise accordingly. In these particular examples, the microphonic compensation engine 212 may implement a microphonic noise compensation model, of a plurality of microphonic noise compensation models, that may depend on a type of microphonic noise detected, as indicated by the microphonic indicator. For example, the microphonic compensation engine 212 may receive a microphonic indicator from the microphonic detection engine 210, select a corresponding microphonic noise compensation model, and use the selected microphonic noise compensation model to compensate for the microphonic noise, as is next described.

Figure 3:
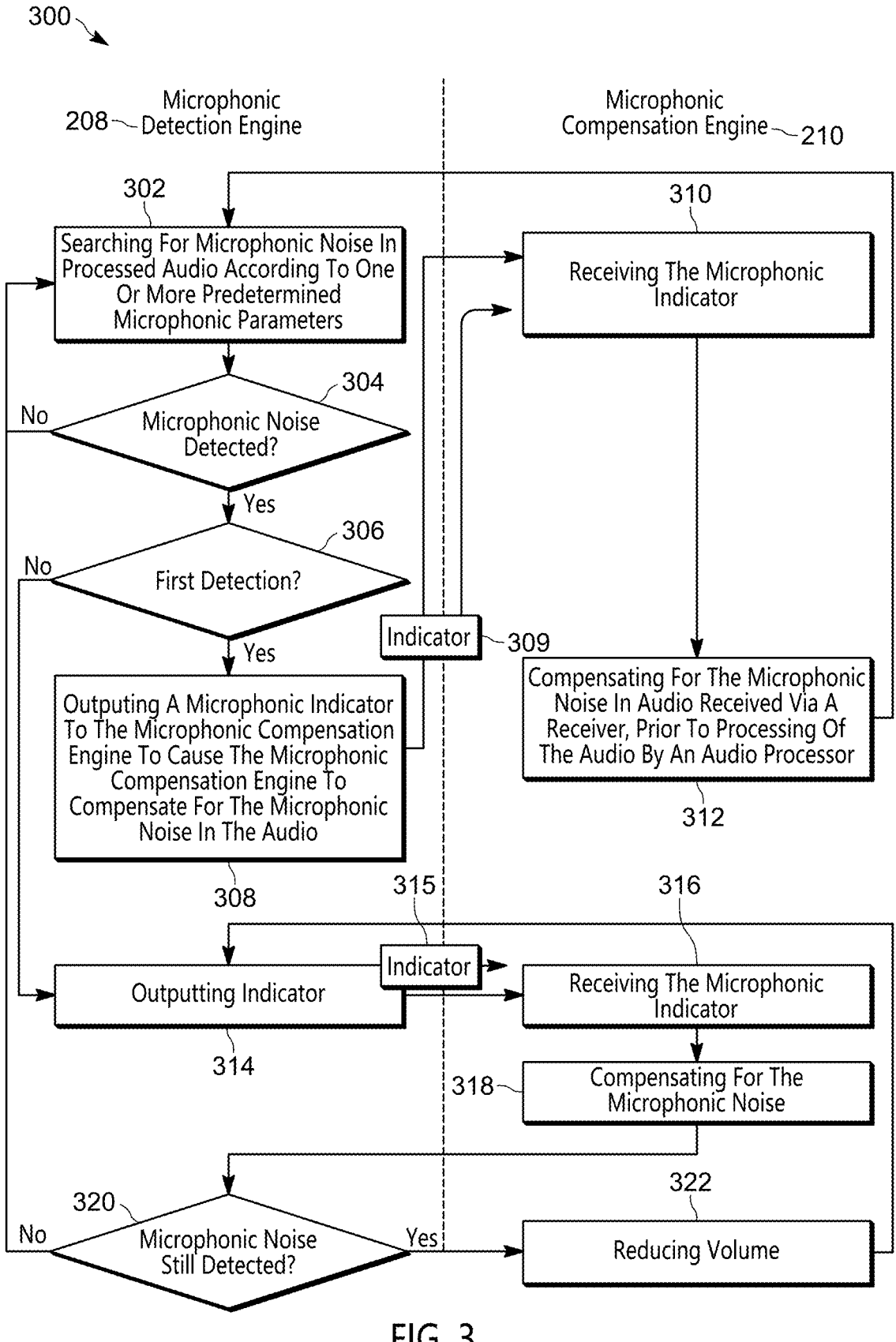
FIG. 3 is a flowchart of a method for microphonic noise compensation, in accordance with some examples.

Attention is now directed to FIG. 3, which depicts a flowchart representative of a method 300 for microphonic noise compensation. The operations of the method 300 of FIG. 3 correspond to the engines 210, 212 and/or machine readable instructions that are executed by the DSP 208. The method 300 of FIG. 3 is one way that the device 100 may be configured. Furthermore, the following discussion of the method 300 of FIG. 3 will lead to a further understanding of the device 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the device 100 of FIG. 1, as well.

Furthermore it is understood that blocks 302, 304, 306, 308, 314, 320 are performed by the microphonics detection engine 210, and blocks 310, 312, 316, 318, 322 are performed by the microphonics compensation engine 212.

At a block 302, the microphonic detection engine 210 searches for microphonic noise in processed audio (e.g. received from the audio processor 206) according to one or more predetermined microphonic parameters.

At a block 304, the microphonic detection engine 210 determines whether microphonic noise is detected in the processed audio.

When no microphonic noise is detected, or the microphonic noise is detected below a given value, such as −4 dB, −5 dB, −6 dB, and the like, (e.g. a "NO" decision at the block 304), the microphonic detection engine 210 continues to search for microphonic noise in the processed audio at the block 302.

When the microphonic noise is detected (e.g. a "YES" decision at the block 304), at an optional block 306, the microphonic detection engine 210 may determine whether the microphonic noise is a first detection of microphonic noise, or a subsequent detection of microphonic noise (e.g. a first or second time for implementing the block 304). While not depicted, the device 100 may implement a detection counter that, upon a first detection of microphonic noise, is incremented from "0" to "1".

When detection of the microphonic noise is a first detection of microphonic noise is detected (e.g. a "YES" decision at the block 306), at a block 308, the microphonic detection engine 210 outputs a microphonic indicator 309 to the microphonic detection engine 210 to cause the microphonic compensation engine to compensate for the microphonic noise in the audio received via the receiver 200.

At a block 310, the microphonic detection engine 210 receives the microphonic indicator 309.

At a block 312, the microphonic detection engine 210 responsively compensates for the microphonic noise in the audio received via the receiver 200, prior to processing of the audio by the audio processor 206.

In a particular example, at the block 310 and/or the block 312, may further select a microphonic noise compensation model that corresponds to the microphonic indicator 309 and use the selected microphonic noise compensation model to compensate for the microphonic noise in the audio received via the receiver 200, prior to processing of the audio by the audio processor 206.

In some examples, the method 300 may end at the block 312, and/or, as depicted, the method 300 may repeat from the block 302, for example such that the microphonic detection engine 210 continues to search for microphonic noise in the processed audio, and the microphonic detection engine 210 continues to compensate for the microphonic noise. Indeed, ignoring for a moment the optional block 306, the blocks 302, 304, 308 310, 312 may form a feedback loop such that as microphonic noise increases or decreases, compensation for the microphonic noise may be adjusted accordingly.

For example, presuming block 306 is omitted, when microphonic noise was previously detected and compensated for during implementation of the blocks 302, 304, 308, 310, 312, and a further implementation of the blocks 302, 304, 308, 310, 312 continues to detect microphonic noise, compensation for the microphonic noise may be increased (e.g. in stepwise increments, for example of 1% increments, 2% increments, 5% increments, and/or in 0.1 dB increments, 0.2 dB increments, 0.5 dB increments, amongst other possibilities) until microphonic noise is no longer detected (e.g. a "NO" decision at the block 304) or some maximum compensation is reached. Such maximum compensation may correspond to the maximum compensation that the microphonic compensation engine 212 is trained to apply to the audio from the receiver 200. Alternatively, or in addition, different microphonic noise compensation models may be selected in a feedback loop to compensate for microphonic noise as the microphonic noise decreases.

Similarly, again presuming block 306 is omitted, when microphonic noise was previously detected and compensated for during implementation of the blocks 302, 304, 308, 310, 312, and a further implementation of the blocks 302, 304, 308, 310, 312 detect no microphonic noise, compensation for the microphonic noise may be reduced (e.g. in stepwise increments, for example of 1% increments, 2% increments, 5% increments, and/or in 0.1 dB increments, 0.2 dB increments, 0.5 dB increments, amongst other possibilities) until microphonic noise is again detected, or compensation ends. Alternatively, or in addition, different microphonic noise compensation models may be selected in a feedback loop to compensate for microphonic noise as the microphonic noise is again detected, or compensation ends.

Examples at which the block 306 is implemented are next described.

In particular, after implementation of the block 312, the blocks 302, 304 are again implemented. When a "YES" decision at the block 304 (e.g., microphonic noise is still detected), the microphonic detection engine 210 determines, at the block 306 that detection of the microphonic noise is a not a first detection of microphonic noise (e.g. a subsequent detection of microphonic noise), and another feedback loop is implemented that includes volume reduction. Put another way, the aforementioned detection counter may be incremented from "1" to "2", and for detection counter values greater than "1", a "NO" decision occurs at the block 306.

In particular, when detection of the microphonic noise is not a first detection of microphonic noise is detected (e.g. a "NO" decision at the block 306), at a block 314, similar to the block 308, the microphonic detection engine 210 again outputs a microphonic indicator 315 to the microphonic detection engine 210, to cause the microphonic detection engine 210 to compensate for the microphonic noise in the audio received via the receiver 200.

At a block 316, similar to the block 310, the microphonic detection engine 210 receives the microphonic indicator 315, and at a block 318, similar to the block 312, the microphonic detection engine 210 again compensates for microphonic noise.

Similar to as previously described, at the block 316 and/or the block 318, may further select a microphonic noise compensation model that corresponds to the microphonic indicator 315 and use the selected microphonic noise compensation model to compensate for the microphonic noise in the audio received via the receiver 200, prior to processing of the audio by the audio processor 206.

At a block 320, similar to the block 306, the microphonic detection engine 210 continues to determine whether microphonic noise is detected (and which is understood to include searching for microphonic noise, similar to the block 302).

However, when the microphonic noise continues to be detected (e.g. a "YES" decision at the block 320), at a block 322, the microphonic detection engine 210 reduces volume of sound output by the speaker 102, as described herein.

The method 300 repeats from the block 314 that, when again implemented, is assumed to again include searching for microphonic noise, similar to the block 302.

Indeed, it is understood in the method 300 that the block 302 may be continually implemented (e.g. and/or periodically implemented) such that when microphonic noise is detected, or changes in microphonic noise occur, a respective microphonic indicator (e.g. similar to the indicators 309, 315) are output to the microphonic detection engine 210.

The feedback loop represented by the blocks 314, 316, 318, 320, 322 may continue until microphonic noise is no longer detected at the block 320 (e.g. a "NO" decision at the block 320), and the method 300 may repeat from the block 302 (e.g. at which point a detection counter associated with the block 306 may be reset to "0"), or the method 300 may end.

Furthermore, at each instance of implementation of the blocks 310, 312, and/or the blocks 316, 318, the microphonic compensation engine 212 may select a same or different microphonic noise compensation model, than in previous implementation of the blocks 310, 312, and/or the blocks 316, 318, depending on whether or not the microphonic indicators 309, 315 are the same, or different.

Alternatively, or in addition, the feedback loop represented by the blocks 314, 316, 318, 320, 322 may continue until a predetermined minimum volume is reached, and the method 300 may end, or the method may repeat.

Indeed, in each instance of the feedback loop represented by the blocks 314, 316, 318, 320, 322, the volume may be incrementally reduced at the block 322 (e.g. in 5% increments, 10% increments, 15% increments, amongst other possibilities), and when the predetermined minimum volume is reached, the method 300 may The method 300 may be adapted to include any suitable features.

For example, the method 300 may further comprise, via the microphonic detection engine 210, continuing to search for the microphonic noise in compensated processed audio (e.g. as received from the audio processor 206); and, when the microphonic noise in the compensated processed audio continues to be detected or is no longer detected, provide, via the receiver/transmitter 200, to an external computing device, a respective notification thereof. For example, the microphonic detection engine 210 may provide the microphonic indicator to the applications processor 214 which may transmit the microphonic indicator, in the form of a notification, to the external computing device via the receiver/transmitter 200.

The method 300 may further comprise, the microphonic detection engine 210: searching (e.g. at the block 302) for microphonic noise in the processed audio (e.g. received from the audio processor 206) according to the one or more predetermined microphonic parameters that are at least partially range based; determine (e.g. at the block 302) one or more of: a level (e.g. in dB) of the microphonic noise; and a range (e.g. in dB), of a plurality of ranges, in which the level of the microphonic noise is located; and generate (e.g. at the block 308 and/or the block 314) the microphonic indicator 309, 315 to indicate one or more of the level and the range of the microphonic noise.

In examples where the microphonic indicator 309, 315 is indicative of a level of the microphonic noise, the method 300 may further comprise the microphonic detection engine 210 (e.g. at the block 312 and/or the block 318): compensating for the microphonic noise in the audio received via the receiver 200 according to the level.

In examples where the microphonic indicator 309, 315 is indicative of a range, of a plurality of ranges, in which a level of the microphonic noise is located, the method 300 may further comprise the microphonic detection engine 210 (e.g. at the block 312 and/or the block 318): compensating for the microphonic noise in the audio received via the receiver 200 according to the range.

In some examples, the method 300 may further comprise the microphonic detection engine 210 (e.g. at the block 312 and/or the block 318): compensating for the microphonic noise in the audio received via the receiver 200 at least partially based on the one or more predetermined microphonic parameters. For example, the aforementioned flags may be based on the one or more predetermined microphonic parameters, and the microphonic detection engine 210 may compensate for the microphonic noise based on a value of a flag.

In some examples, the method 300 may further comprise, when the microphonic detection engine 210 continues to detect microphonic noise in the processed audio after the microphonic detection engine 210 compensates for the microphonic noise in the audio: reducing volume of sound emitted by the speaker 102; and continue to compensate for the microphonic noise in the audio received via the receiver 200, prior to processing of the audio by the audio processor 206.

In some examples, the method 300 may further comprise, the microphonic detection engine 210 and the microphonic detection engine 210 continuing to respectively detect and compensate for the microphonic noise in a feedback loop, and, with each instance of the feedback loop where the microphonic noise continues to be detected, the microphonic detection engine 210 reduces volume of sound emitted by the speaker until the microphonic noise is no longer detected.

In some examples, the method 300 may further comprise, the microphonic detection engine 210 and the microphonic detection engine 210 continuing to respectively detect and compensate for the microphonic noise in a feedback loop, and, with each instance of the feedback loop where the microphonic noise continues to be detected, the microphonic detection engine 210 reduces volume of sound emitted by the speaker until a predetermined minimum volume is reached.

Attention is next directed to FIG. 4, FIG. 5, FIG. 6 and FIG. 7, which depict aspects of the method 300. FIG. 4, FIG. 5, FIG. 6 and FIG. 7 are similar to FIG. 2, with like components having like numbers.

Figure 4:
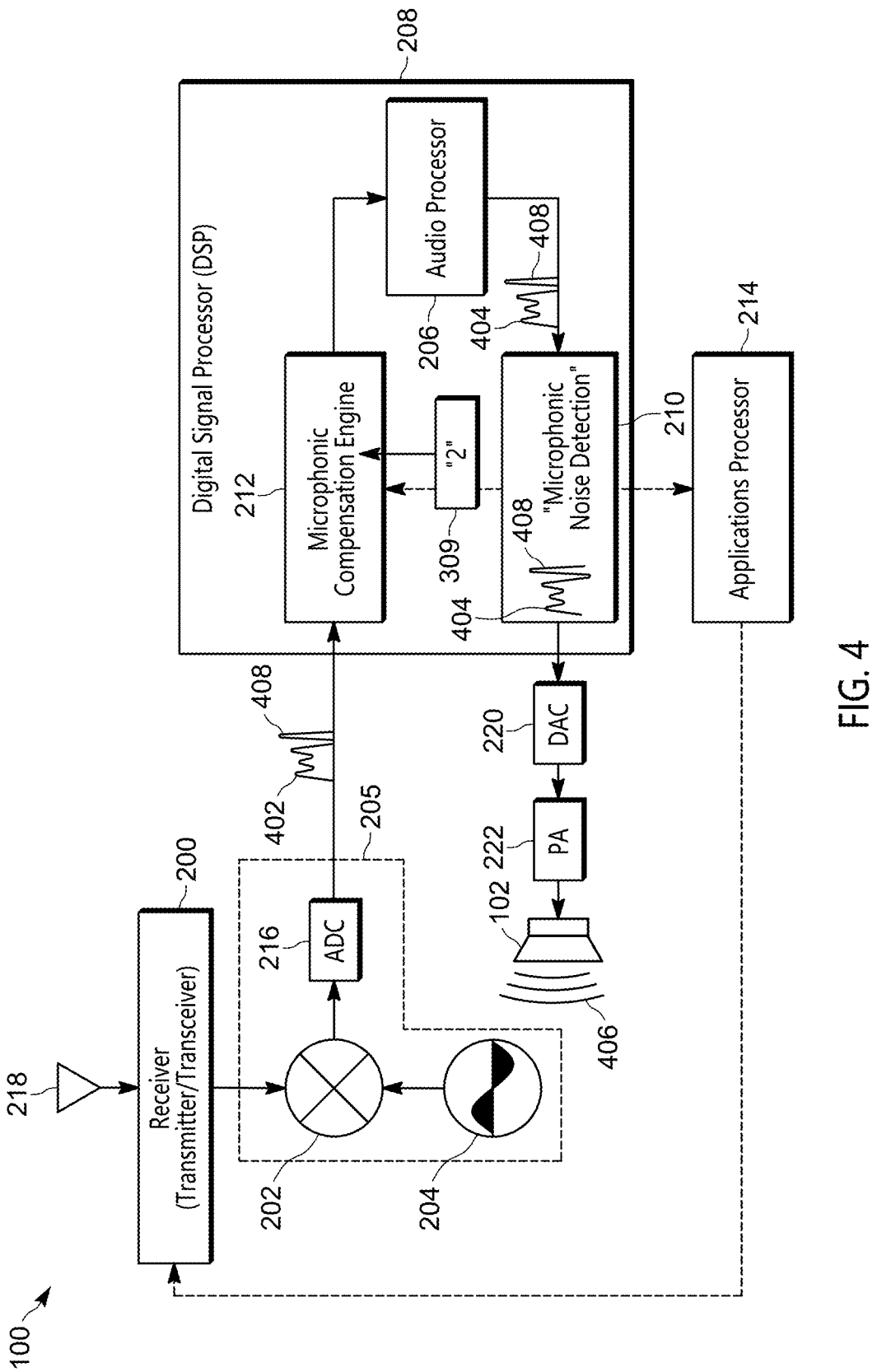
FIG. 4 depicts the device structure of FIG. 2 implementing a method for microphonic noise compensation, in accordance with some examples.

With attention first directed to FIG. 4, which depicts the device 100 before microphonic noise compensation occurs, audio 402 is received via the receiver 200, downmixed via the RF mixer 202 and VCO 204, digitized by the ADC 216, and processed by the audio processor 206 on the audio path to generate processed audio 404, which is provided to the speaker 102 (e.g. via the microphonic detection engine 210, the DAC 220 and the audio power amplifier 222), which outputs sound 406. As depicted the sound 406 causes the VCO 204 to vibrate, which introduces microphonic noise 408 into the audio 402 and the processed audio 404, such that the sound 406 is understood to include the aforementioned howling sound. The noise 408 is understood to persist after the downmixing.

As depicted, the microphonic detection engine 210 searches (e.g. at the block 302 of the method 300) for microphonic noise in the processed audio 404 and detects (e.g. a "YES" decision at the block 304 of the method 300) the microphonic noise 408 in the processed audio 404.

Presuming a "YES" decision at the block 306, the microphonic detection engine 210 provides (e.g. at the block 308 of the method 300) the microphonic indicator 309 to the microphonic compensation engine 212. As depicted, the microphonic indicator 309 indicates a flag of "2", which may indicate that the microphonic noise 408 is in a range of "−2 dB to −4 dB", as previously described. The microphonic compensation engine 212 receives the microphonic indicator 309 (e.g. at the block 310 of the method 300).

Figure 5:
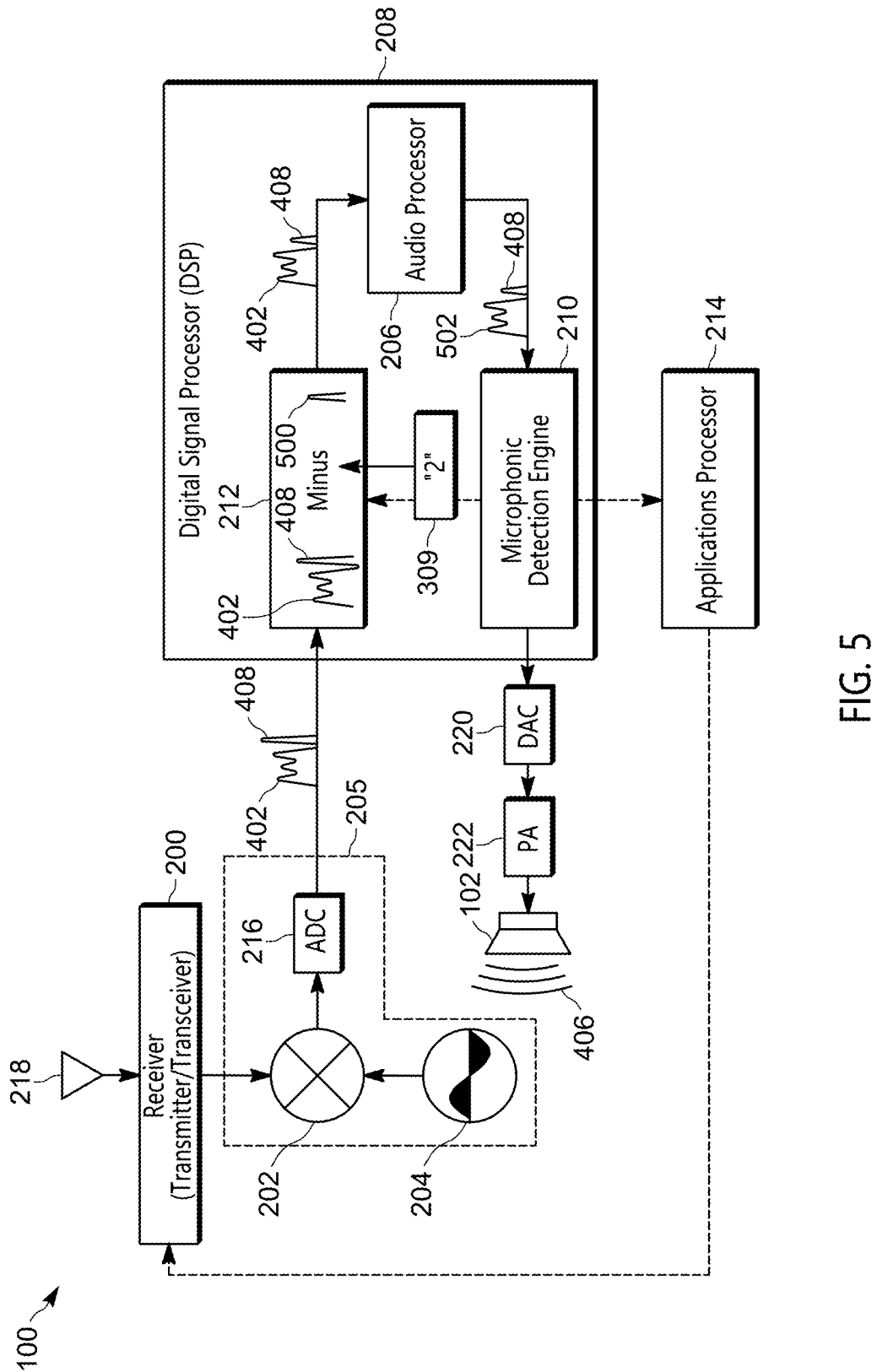
FIG. 5 depicts the device structure of FIG. 2 continuing to implement a method for microphonic noise compensation, in accordance with some examples.

Turning to FIG. 5, having received the microphonic indicator 309 of "2", the microphonic compensation engine 212 may select a corresponding microphonic noise compensation model and compensate (e.g. at the block 312 of the method 300) for the microphonic noise 408, using the selected microphonic noise compensation model, by sub-tracting, from the audio 402, a signal 500 corresponding to microphonic noise in a range of "–2 dB to –4 dB", for example the signal 500 may be "–3 dB", and may be at a same frequency as the microphonic noise 408.

The microphonic compensation engine 212 outputs the audio 402 with the microphonic noise 408 reduced. The audio processor 206 processes the audio 402 with the microphonic noise 408 as reduced to generate processed audio 502 that includes the microphonic noise 408 as reduced.

Figure 6:
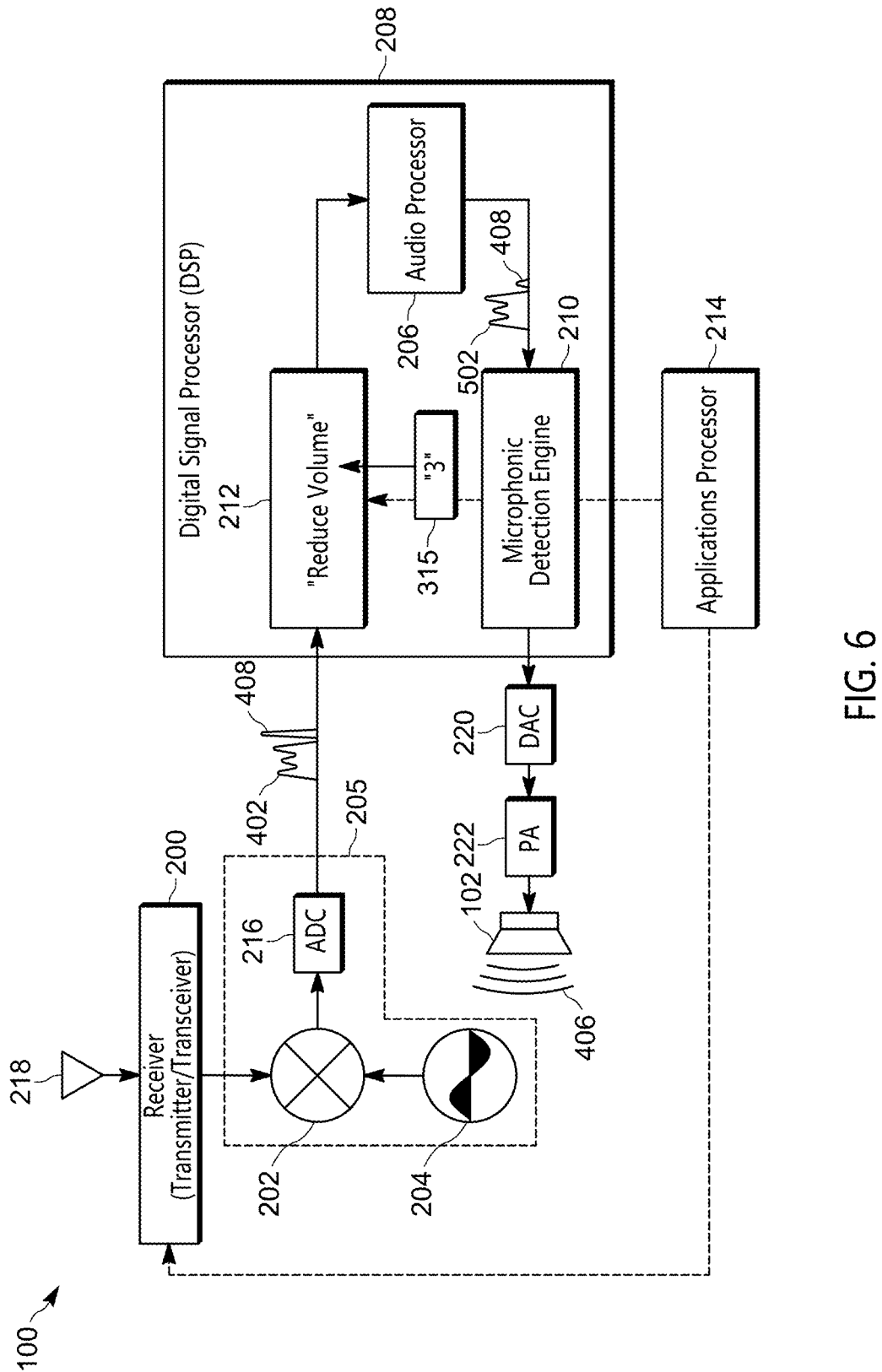
FIG. 6 depicts the device structure of FIG. 2 implementing a method for microphonic noise compensation, in accordance with some examples.

Turning now to FIG. 6, which follows from FIG. 5, it is understood that the audio 402 continues to include the microphonic noise 408, and that the microphonic compen-sation engine 212 continues to reduce the microphonic noise 408 to compensate for the microphonic noise 408. Presum-ing that another attempt to reduce the microphonic noise 408 (e.g. at the blocks 314, 316, 318) results in the microphonic noise 408 continuing to be detected by the microphonic detection engine 210 (e.g. as indicated by the indicator 315 having a flag of "3", indicating that the microphonic noise 408 is now in a range of "–4 dB to –6 dB"), the microphonic compensation engine 212 may implement any suitable action to reduce (e.g. at the block 322 of the method 300) the volume of the sound 406 output by the speaker 102.

Furthermore, as the indicator 315 of "3" is different from the indicator 309 of "2" of the example of FIG. 4 and FIG. 5, the microphonic compensation engine 212 may select a different microphonic noise compensation model, as com-pared to the example of FIG. 4 and FIG. 5 and compensate for the microphonic noise 408 using the different selected microphonic noise compensation model.

Figure 7:
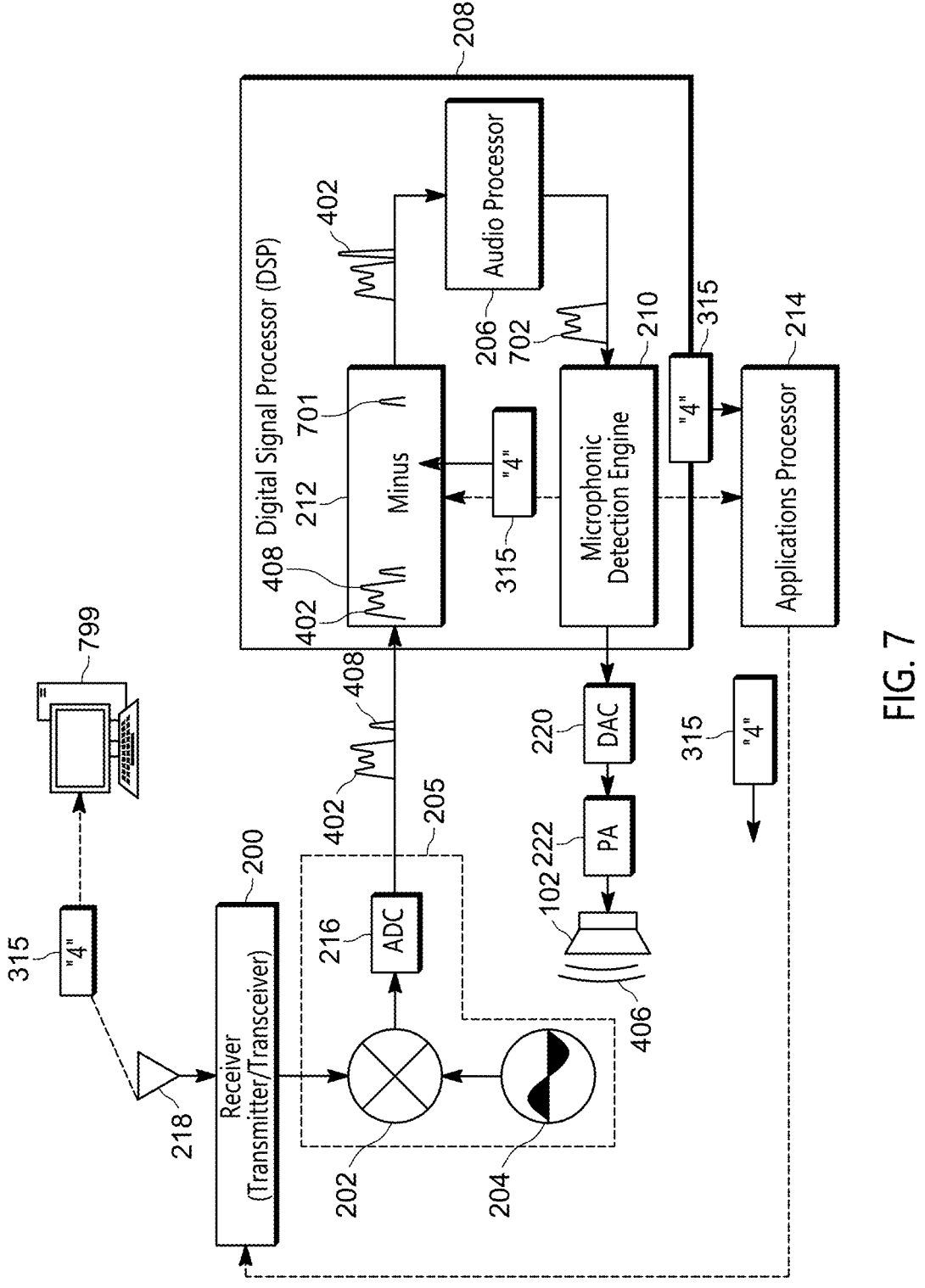
FIG. 7 depicts a system that includes the device structure of FIG. 2 and an external computing device, continuing to implement a method for microphonic noise compensation, in accordance with some examples.

For example, as depicted in FIG. 7, which follows from FIG. 6, and depicts a system 700 comprising the device 100 and an external computing device 799, the sound 406 is reduced, resulting in lower microphonic noise 408 in the audio 402 received via the receiver 200. The microphonic compensation engine 212 (e.g. on the basis of the indicator 315 of "3", or another value that occurs after the volume of the sound 406 is reduced), subtracts, from the audio 402, a signal 701 corresponding to microphonic noise in a range of "–4 dB to –6 dB", for example the signal 701 may be "–4 dB", and may be at a same frequency as the microphonic noise 408. The microphonic compensation engine 212 out-puts the audio 402 with the microphonic noise 408 elimi-nated. The audio processor 206 processes the audio 402 with the microphonic noise 408 eliminated to generate processed audio 702 used to drive the speaker 102.

FIG. 7 further depicts the microphonic detection engine 210 determining a microphonic indicator 315 of "4", which may indicate to the microphonic compensation engine 212 that the microphonic noise 408 has been eliminated, which may cause the microphonic detection engine 210 to reduce compensation or maintain compensation, for example in a feedback loop with the microphonic detection engine 210.

As depicted the microphonic detection engine 210 pro-vides the microphonic indicator 315 to the applications processor 214, which controls receiver/transmitter 200 to transmit the microphonic indicator 315 to an external com-puting device 799, via the antenna 218. While not depicted, current audio settings of the communications device 100 may be provided to the external computing device 799, such that the combination of the microphonic indicator 315 of "4", and the current audio settings of the communications device 100, indicate to the external computing device 799 a set of audio settings of the communication device 100 for which microphonic noise was compensated.

However, when the communication device 100 is not able to compensate for microphonic noise (e.g. a "YES" decision at the block 320 of the method 300), rather than volume being reduced at the communication device 100 (e.g. at the block 322 of the method 300), one or more microphonic noise compensation models associated with the communi-cation device 100 may be retrained, as is next described. In particular, the following discussion describes an example of how the system 700 may respond to the communication device 100 providing a microphonic indicator 315 to the external computing device 799 that indicates that the com-munication device 100 was not able to compensate for microphonic noise (e.g. due to changes at the communica-tion device 100 and/or the microphonic noise over time, audio settings at the communication device 100, and the like, amongst other possibilities).

Figure 8:
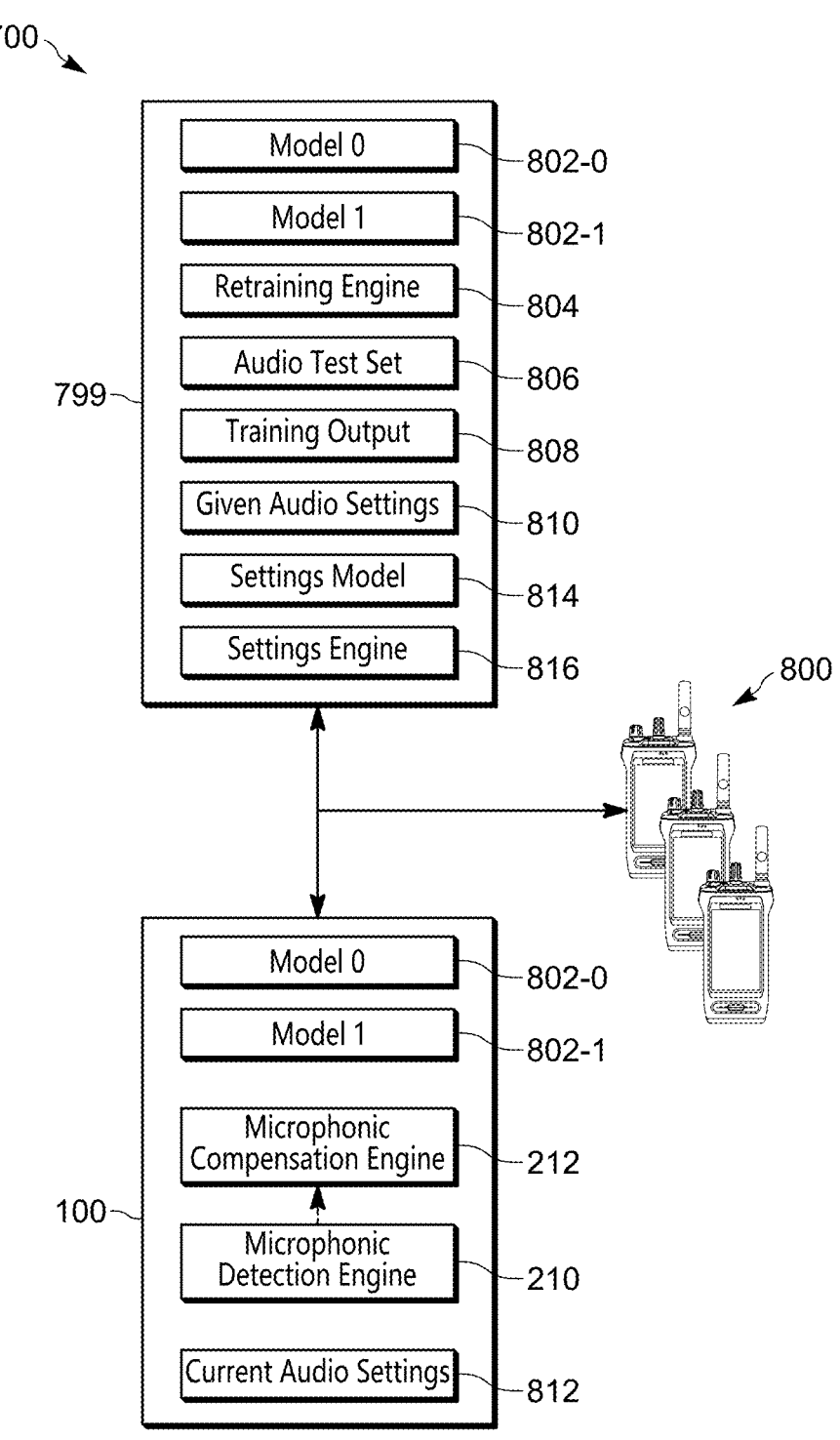
FIG. 8 depicts the system of FIG. 7, showing specific components of the device of FIG. 2, and the external computing device, at least a portion of which are used for retraining a microphonic noise compensation model, in accordance with some examples.

Attention is next directed to FIG. 8, which depicts the system 700 showing the communication device 100 and the external computing device 799 communicatively coupled via a communication link depicted as a double-ended arrow therebetween, and which may comprise any suitable com-bination of wireless and/or wired networks. For simplicity, the external computing device 799 is hereafter interchange-ably referred to as the computing device 799. Furthermore, while not all components of the communication device 100 are depicted in FIG. 8, it is understood that such components are nonetheless present; for example, at FIG. 8, the engines 210, 212 are depicted at the communication device 100, but not the remaining components of the communication device 100, which are nonetheless understood to be present.

Furthermore, as depicted, at least the computing device 799 may be communicatively coupled to one or more other communication devices 800, that may be similar to (e.g. in make and model) to the communication device 100. Indeed, processes described herein with respect to the communica-tion device 100 may also occur at, or in conjunction with, the other communication devices 800. While the communica-tion devices 100, 800 may also be communicatively coupled, such communicatively coupling is understood to be optional.

Also depicted in FIG. 8, at the devices 100, 799, are a plurality of microphonic noise compensation models 802-0, 802-1, interchangeably referred to hereafter, collectively, as the microphonic noise compensation models 802, and, generically, as a microphonic noise compensation model 802. While only two microphonic noise compensation mod-els 802, the system 700 may comprise any suitable number of microphonic noise compensation models 802, for example a microphonic noise compensation model 802 per value of microphonic indicator. Using the aforementioned example of a microphonic indicator being a flag of one of "0", "1", "2", "3", the system 700 may comprise four microphonic noise compensation models 802 (e.g., there may be no microphonic noise compensation model 802 corresponding to the flag "4" as the flag "4" indicates that microphonic noise has been compensated at the communi-cation device 100).

However, for simplicity, to describe retraining of one or more of the microphonic noise compensation models 802, only two microphonic noise compensation models 802 are described, each corresponding to a possible value of a microphonic indicator of "1" or "2", where a flag of "0" may indicate microphonic noise in a range of "greater than 0 dB", and a flag of "1" may indicate microphonic noise in a range of "0 dB to –6 dB". Alternatively, a microphonic indicator may indicate a value and/or range of microphonic noise, as has been previously described.

Hence, it is understood that the microphonic noise compensation model 802-0 is pretrained to compensate for microphonic noise greater than 0 dB, and the microphonic noise compensation model 802-1 is pretrained to compensate for microphonic noise in a range of 0 dB to −6 dB. Put another way, for simplicity, and in contrast to the examples of FIG. 1 to FIG. 7, the microphonic noise compensation model 802-1 of the example of FIG. 8 combines functionality of a microphonic noise compensation models corresponding to flags and/or values of "1", "2", and "3".

As also depicted in FIG. 8, the microphonic noise compensation models 802 are generally stored at both devices 100, 799, and may initially be in a same state.

Figure 10:
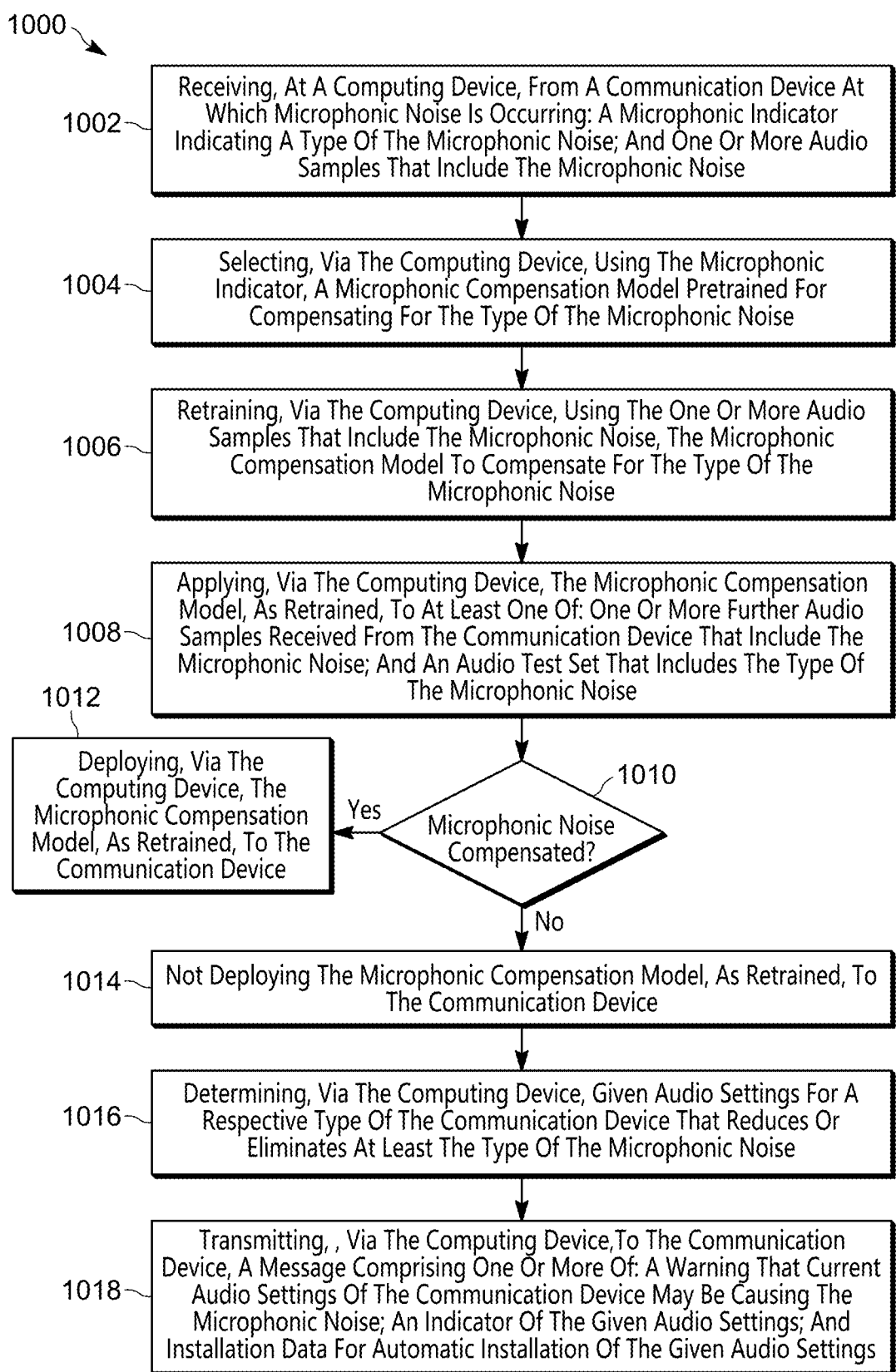
FIG. 10 is a flowchart of a method for retraining a microphonic noise compensation model, in accordance with some examples.

However, as also depicted in FIG. 8, the computing device 799 may comprise a retraining engine 804 that implements functionality described herein with respect to FIG. 10, to retrain one or more of the microphonic noise compensation models 802.

Furthermore, as depicted, the computing device 799 may store an audio test set 806, comprising one or more recordings (e.g. audio files) of microphonic noise, similar to the microphonic noise 408 generated at the communication device 100. Furthermore, the audio test set 806 may comprise different recordings of microphonic noise that correspond to microphonic noise greater than 0 dB and in a range of 0 dB to −6 dB.

In some examples, the audio test set 806 is understood to include recordings of microphonic noise and may exclude other types of audio data, and/or more specifically exclude voice data. In particular, the communication device 100 may be used primarily to transmit and receive audio data in the form of voice data, and as such voice data changes over time, and/or at each instance thereof, the audio test set 806 may include microphonic noise and exclude voice data such that, once a microphonic noise compensation model 802 is retrained, the microphonic noise compensation model 802 may be applied to the audio test set 806, and/or a subset thereof, to determine whether or not microphonic noise is removed and/or reduced to below a given value, such as −6 dB, −7 dB, −8 dB, amongst other possibilities. However, in other examples some audio recordings of the audio test set 806 may include voice data, or other types of audio data, in addition to microphonic noise. The audio test set 806 may be generated by an administrator of the system 700, and/or the audio test set 806 may be populated by receiving audio recordings from one or more of the communication devices 100, 800 at which microphonic noise is occurring.

As also depicted in FIG. 8, the computing device 799 may store training output 808, used to retrain one or more of the microphonic noise compensation models 802. In particular, the training output 808 may comprise audio recordings that exclude microphonic noise and other types of audio data, such as voice data. As has been previously described, as other types of audio data, such as voice data, may change over time, the training output 808 may exclude microphonic noise and other types of audio data, such as voice data, and be used with training input for retraining one or more of the microphonic noise compensation models 802 that may include one or more audio samples received from the communication device 100 that includes microphonic noise, but excludes other types of audio data, such as voice data.

Also depicted in FIG. 8, the computing device 799 may store predetermined given audio settings 810 for a respective type of the communication device 100 that reduces or eliminates at least a type of microphonic noise occurring at the communication device 100. For example, the given audio settings 810 may be predetermined and/or received from the other communication devices 800 of a same and/or similar make and model as the communication device 100, that, when applied at a communication device 800 of the respective type of the communication device 100, resulted in a reduction or elimination of microphonic noise. The given audio settings 810 may include one or more of a volume level, a bass level, a treble level, or any other suitable type of equalizer settings in any suitable frequency ranges, that resulted in a reduction or elimination of microphonic noise. One example of generating at least a portion of the given audio settings 810 is described with respect to FIG. 16 and FIG. 17.

As also depicted in FIG. 8, the communication device 100 stores current audio settings 812, that may include one or more of a current volume level, a current bass level, a current treble level, or any other suitable type of current equalizer settings in any suitable frequency ranges.

As also depicted in FIG. 8, the computing device 799 may store a settings machine learning model 814 that may be trained to select given audio settings that reduces or eliminates microphonic noise for the same respective types of the communication device 100 and the other communication devices 800, as described herein. In particular, the settings engine 816 at the computing device 799 may be used to train the settings machine learning model 814 and/or use the settings machine learning model 814 to generate the given audio settings 810 for the communication device 100 to reduce and/or eliminate microphonic noise.

Figure 9:
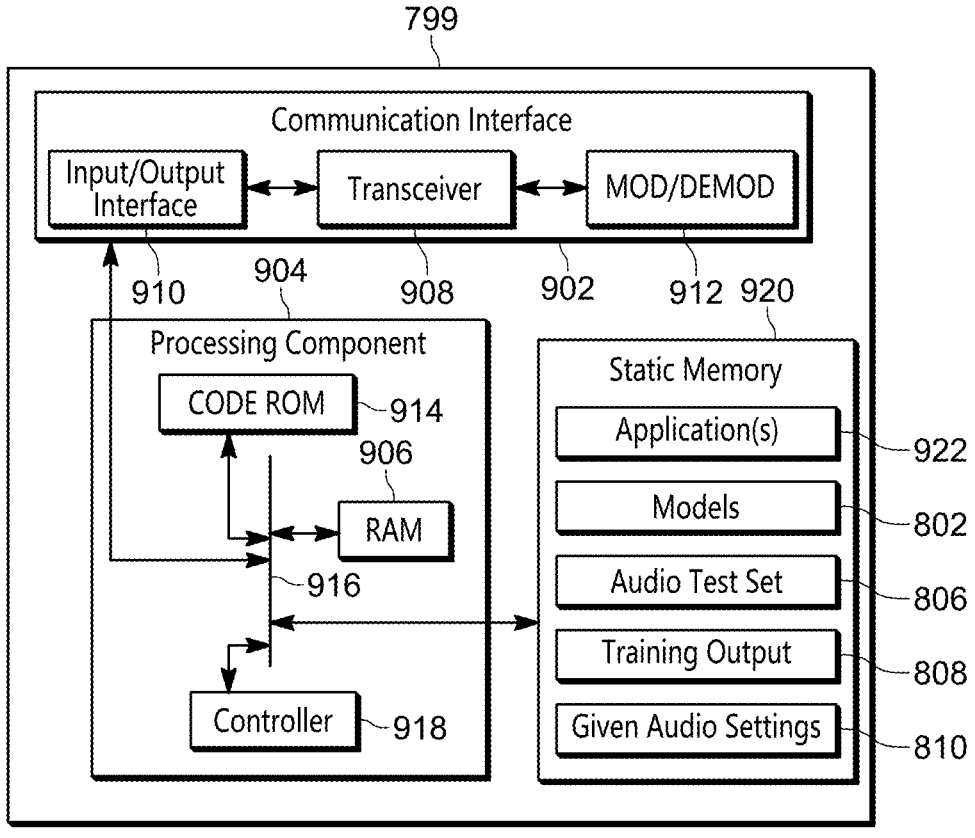
FIG. 9 is a device diagram showing a device structure of the external computing device for retraining a microphonic noise compensation model, in accordance with some examples.

Prior to discussing the functionality of the computing device 799 retraining one or more of the microphonic noise compensation models 802, attention is next directed to FIG. 9, which depicts a schematic block diagram of an example of the computing device 799. While the computing device 799 is depicted in FIG. 9 as a single component, the computing device 799 may be provided in a single component, or distributed among a plurality of components and the like including, but not limited to, any suitable combination of one or more servers, one or more cloud computing devices, and the like.

As depicted, the computing device 799 comprises: a communication interface 902, a processing unit 904, a Random-Access Memory (RAM) 906, one or more wireless transceivers 908 (e.g., which may be optional), one or more wired and/or wireless input/output (I/O) interfaces 910, a combined modulator/demodulator 912, a code Read Only Memory (ROM) 914, a common data and address bus 916, a controller 918, and a static memory 920 storing at least one application 922. Hereafter, the at least one application 922 will be interchangeably referred to as the application 922. Furthermore, while the memories 906, 914 are depicted as having a particular structure and/or configuration, (e.g., separate RAM 906 and ROM 914), memory of the computing device 799 may have any suitable structure and/or configuration.

While not depicted, the computing device 799 may include, and/or be in communication with, one or more of an input component and a display screen (and/or any other suitable combination of input and/or output components) and the like.

As shown in FIG. 9, the computing device 799 includes the communication interface 902 communicatively coupled to the common data and address bus 916 of the processing unit 904.

The processing unit 904 may include the code Read Only Memory (ROM) 914 coupled to the common data and address bus 916 for storing data for initializing system components. The processing unit 904 may further include the controller 918 coupled, by the common data and address bus 916, to the Random-Access Memory 906 and the static memory 920.

The communication interface 902 may include one or more wired and/or wireless input/output (I/O) interfaces 910 that are configurable to communicate with other components of the system 700. For example, the communication interface 902 may include one or more wired and/or wireless transceivers 908 for communicating with other suitable components of the system 700, such as the communication device 100. Hence, the one or more transceivers 908 may be adapted for communication with one or more communication links and/or communication networks used to communicate with the other components of the system 700. For example, the one or more transceivers 908 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 908 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication interface 902 may further include one or more wireline transceivers 908, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 908 may also be coupled to a combined modulator/demodulator 912.

The controller 918 may include ports (e.g., hardware ports) for coupling to other suitable hardware components of the system 700.

The controller 918 may include one or more logic circuits, one or more processors, one or more microprocessors, one or more GPUs (Graphics Processing Units), and/or the controller 918 may include one or more ASIC (application-specific integrated circuits) and one or more FPGA (field-programmable gate arrays), and/or another electronic device. In some examples, the controller 918 and/or the computing device 799 is not a generic controller and/or a generic device, but a device specifically configured to implement functionality for retraining a microphonic noise compensation model. For example, in some examples, the computing device 799 and/or the controller 918 specifically comprises a computer executable engine configured to implement functionality for retraining a microphonic noise compensation model.

The static memory 920 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 9, programming instructions (e.g., machine readable instructions) that implement the functionality of the computing device 799 as described herein are maintained, persistently, at the memory 920 and used by the controller 918, which makes appropriate utilization of volatile storage during the execution of such programming instructions.

Regardless, it is understood that the memory 920 stores instructions corresponding to the at least one application 922 that, when executed by the controller 918, enables the controller 918 to perform a set of operations comprising the blocks of the method of FIG. 10. In particular, the at least one application 922 may correspond to instructions that, when executed by the controller 918, enables the controller 918 to implement functionality of the retraining engine 804 (e.g. and the settings engine 816).

As further depicted in FIG. 9, the memory 920 stores the microphonic noise compensation models 802, the audio test set 806, the training output 808 and the given audio settings 810.

Attention is now directed to FIG. 10, which depicts a flowchart representative of a method 1000 for retraining a microphonic noise compensation model. The operations of the method 1000 of FIG. 10 correspond to machine readable instructions that are executed by the controller 918 of the computing device 799, such as the application 922. The method 1000 of FIG. 10 is one way that the controller 918 and/or the computing device 799, and/or the system 700 may be configured. Furthermore, the following discussion of the method 1000 of FIG. 10 will lead to a further understanding of the system 700, and its various components. The method 1000 of FIG. 10 may be implemented on variations of the system 700 of FIG. 1, as well.

The method 1000 of FIG. 10 need not be performed in the exact sequence as shown and likewise various blocks may be performed in parallel rather than in sequence. Accordingly, the elements of method 1000 are referred to herein as "blocks" rather than "steps."

At a block 1002, the controller 918, and/or the computing device 799, receives (e.g. via the communication interface 902), from the communication device 100 at which microphonic noise is occurring: a microphonic indicator indicating a type of the microphonic noise; and one or more audio samples that include the microphonic noise.

In some examples, it is understood that the method 1000 may be initiated by the communication device 100 providing the microphonic indicator indicating the type of the microphonic noise, and one or more audio samples that include the microphonic noise, when the communication device 100 is unable to compensate for microphonic noise. For example, the method 1000 may be initiated when the communication device 100 continues to detect microphonic noise at the block 320 of the method 300. Put another way, rather than implement the block 322 to reduce volume at the communication device 100, the communication device 100 (in response to a "YES" decision at the block 320 of the method 300), may provide, to the computing device 799, the microphonic indicator indicating the type of the microphonic noise, and one or more audio samples that include the microphonic noise.

In some examples, it is understood that the communication device 100 may be streaming audio to the computing device 799 (in response to a "YES" decision at the block 320 of the method 300), and the one or more audio samples may include streamed audio.

In particular examples, the method 1000 may further comprise the controller 918, and/or the computing device 799, selecting one or more particular audio samples, from the one or more audio samples (e.g. received at the block 1002), that exclude voice data; and performing the retraining of the microphonic noise compensation model 802 using the one or more particular audio samples that exclude the voice data.

Figure 12:
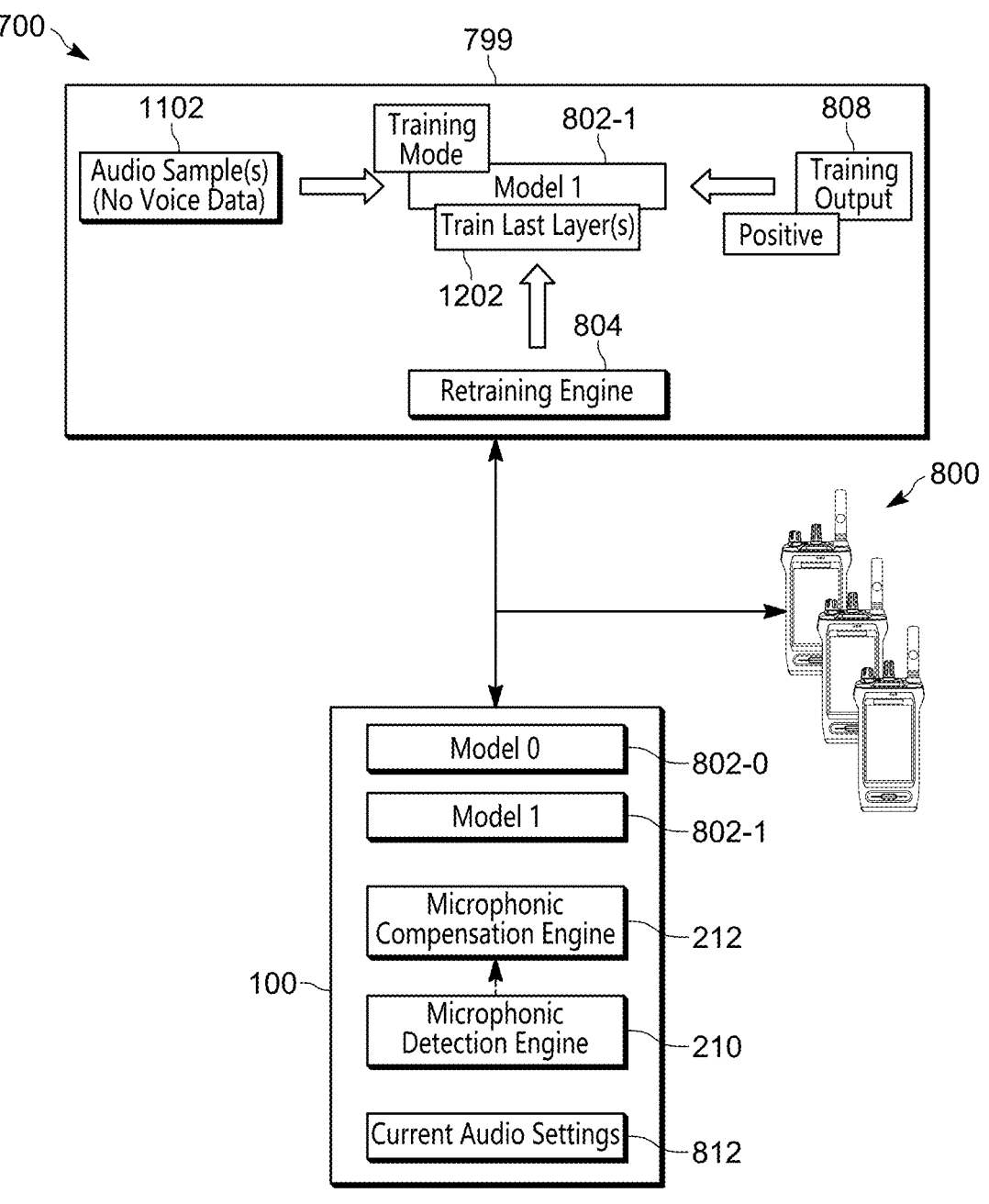
FIG. 12 depicts the system of FIG. 8 continuing to implement a method for retraining a microphonic noise compensation model, in accordance with some examples.

For example, one or more particular audio samples received at the block 1002 that exclude voice data, and include microphonic noise, may be used as input training data, and the training output 808 may be used as output training data and/or positive output training data, described with respect to FIG. 12.

Hence, in some examples, the controller 918 and/or the computing device 799 may be configured to analyze audio samples received at the block 1002, and discriminate and/or distinguish between audio samples that include voice data and microphonic noise, and audio samples that exclude voice data, but include microphonic noise, and select only those audio samples that exclude voice data, but include microphonic noise, for use as training input. Such an example assumes that the training output 808, used as output training data, also excludes voice data. Indeed, as voice data may change over time in audio samples from the communication device 100, it may be challenging to provide training output that includes the same voice data, but excludes microphonic noise, though, in some cases, the controller 918 and/or the computing device 799 may be further configured to extract the voice data from the audio samples, and generate training output that includes the extracted voice data, but excludes microphonic noise.

Alternatively, or in addition, in examples where the training output 808 is used as output training data, the communication device 100 may be configured to discriminate and/or distinguish between audio samples that include voice data and microphonic noise, and audio samples that exclude voice data, but include microphonic noise, and transmit and/or provide and/or stream only those audio samples that exclude voice data, but include microphonic noise to the computing device 799. Indeed, in some of these examples, the communication device 100 may be configured to start streaming audio to the computing device 799 when no voice data is detected in audio received at the receiver 200, and to stop streaming audio to the computing device 799 when voice data is detected in audio received at the receiver 200.

At a block 1004, the controller 918, and/or the computing device 799, selects, using the microphonic indicator, a microphonic noise compensation model 802 pretrained for compensating for the type of the microphonic noise.

For example, the microphonic indicator may comprise a flag of "0" or "1", and the controller 918, and/or the computing device 799 may respectively select the microphonic noise compensation model 802-0, or the microphonic noise compensation model 802-1, accordingly.

Put another way, as previously described, the microphonic noise may be of a first type or a second type (e.g. related to amplitude of the microphonic noise), and the microphonic indicator may indicate the first type or the second type (e.g. by way of a flag of "0" or "1").

Furthermore, it is understood that the microphonic noise compensation model 802 selected at the block 1004 may be one of a plurality of microphonic noise compensation models 802, and the plurality of microphonic noise compensation models 802 may be pretrained to compensate for different respective types of the microphonic noise.

At a block 1006, the controller 918, and/or the computing device 799, retrains, using the one or more audio samples that include the microphonic noise, the microphonic noise compensation model 802 (e.g. selected at the block 1004) to compensate for the type of the microphonic noise.

For example, the controller 918, and/or the computing device 799, may place the selected microphonic noise compensation model 802 into a training mode, via the retraining engine 804, and use the one or more audio samples received at the block 1002 as input training data, and use the training output 808 as output training data.

At a block 1008, the controller 918, and/or the computing device 799, applies the microphonic noise compensation model 802, as retrained, to at least one of: one or more further audio samples received from the communication device 100 that include the microphonic noise; and the audio test set 806 that includes the type of the microphonic noise.

At a block 1010, the controller 918, and/or the computing device 799, determines whether or not the microphonic noise compensation model 802 (e.g. as retrained) compensates for the microphonic noise in at least one of the one or more further audio samples and the audio test set 806.

For example, at the block 1008, the controller 918, and/or the computing device 799 may place the microphonic noise compensation model 802, as retrained, into a normal and/or operational mode (e.g., and/or take the microphonic noise compensation model 802 out of the training mode), and input one more further audio samples received from the communication device 100 that include the microphonic noise into the microphonic noise compensation model 802, as retrained, and analyze the output. Such further audio samples are understood to be different from the audio samples used to retrain the microphonic noise compensation model 802 at the block 1006, and may be received before, after, or during receipt of the audio samples used to retrain the microphonic noise compensation model 802 at the block 1006. Such further audio samples may include or exclude voice data. Indeed, when the controller 918, and/or the computing device 799 distinguishes between audio samples that include and exclude voice data, and the audio samples that exclude voice data may be used to retrain the microphonic noise compensation model 802, and the audio samples that include voice data may be used as the one more further audio samples used to determine whether or not the microphonic noise compensation model 802, as retrained, compensates for microphonic noise at the block 1010.

Alternatively, or in addition, at the block 1008, the controller 918, and/or the computing device 799 may use at least a portion of the audio test set 806 that includes microphonic noise (e.g., of a same type indicated by the microphonic indicator) as input to the microphonic noise compensation model 802, as retrained, and analyze the output.

Regardless of whether one more further audio samples received from the communication device 100 and/or at least a portion of the audio test set 806 is used as input to the microphonic noise compensation model 802, as retrained, the controller 918, and/or the computing device 799 (e.g. via the retraining engine 804) may analyze the output to detect whether, or not, the output continues to include microphonic noise, and/or whether, or not, microphonic noise has been reduced to below a given amplitude, for example of −6 dB. Indeed, as microphonic noise tends to have certain predictable characteristics, such as being within a given frequency range (e.g., to produce the aforementioned howling noise), the controller 918, and/or the computing device 799 may be further configured to detect (e.g. similar to the microphonic detection engine 210) microphonic noise, and a level thereof, in audio.

When the microphonic noise compensation model 802 compensates for the microphonic noise in at least one of the one or more further audio samples and the audio test set 806 (e.g. a YES decision at the block 1010, such that the microphonic noise has been eliminated or reduced to below a given amplitude), the controller 918, and/or the computing device 799, at a block 1012, deploys (e.g. transmits, via the communication interface 902) the microphonic noise compensation model 802, as retrained, to the communication device 100. The communication device 100 may then implement the microphonic noise compensation model 802, as retrained via the microphonic compensation engine 212.

However, when the microphonic noise compensation model 802 fails to compensate for the microphonic noise in at least one of the one or more further audio samples and the audio test set 806 (e.g. a NO decision at the block 1010 such that the microphonic noise has not been eliminated or not reduced to below a given amplitude), the controller 918, and/or the computing device 799, at a block 1016, may determine determining given audio settings 810 for a respective type of the communication device 100 that reduces or eliminates at least the type of the microphonic noise.

At a block 1016, the controller 918, and/or the computing device 799 may transmit (e.g. via the communication interface 902), to the communication device 100, a message comprising one or more of: a warning that the current audio settings 812 may be causing the microphonic noise; an indicator of the given audio settings 810 that reduces or eliminates at least the type of the microphonic noise; and installation data for automatic installation of the given audio settings 810.

Such a warning and/or indicator, and/or a respective request for accepting or rejecting the installation data, may be provided at a display screen, or other output device, of the communication device 100.

For example, a warning and/or indicator of the given audio settings 810 that reduces or eliminates at least the type of the microphonic noise that the current audio settings 812 may be causing the microphonic noise may prompt an operator of the communication device 100 to change, or at least partially change, the current settings 812 to the given audio settings 810, or any other suitable audio settings.

The respective request for accepting or rejecting the installation data may prompt the operator of the communication device 100 to accept the request causing automatic installation of the given audio settings 810, causing the current settings 812 to automatically change to the given audio settings 810. Alternatively, receipt of the installation data for automatic installation of the given audio settings 810 at the communication device 100 may cause the communication device 100 to automatically install the given audio settings 810, though the communication device 100 may optionally provide an indication that such a change is occurring, as the operator of the communication device 100 may experience a reduction in volume and/or a change in bass and/or treble level, and the like, when the installation occurs.

Put another way, in some examples, the method 1000 may further comprise, the controller 918, and/or the computing device 799: when the microphonic noise compensation model 802 (e.g. as retrained) fails to compensate for the microphonic noise in at least one of the one or more further audio samples and the audio test set 806: determining given audio settings 810 for a respective type of the communication device that reduces or eliminates at least the type of the microphonic noise (e.g. as indicated by the microphonic indicator received at the block 1002); and transmitting, to the communication device 100, a message comprising a warning that the current audio settings 812 of the communication device 100 may be causing the microphonic noise.

In yet further examples, the method 1000 may further comprise, the controller 918, and/or the computing device 799, when the microphonic noise compensation model 802 (e.g. as retrained) fails to compensate for the microphonic noise in at least one of the one or more further audio samples and the audio test set 806: determining given audio settings 810 for a respective type of the communication device 100 that reduces or eliminates at least the type of the microphonic noise; and transmitting, to the communication device 100, a message indicating the given audio settings 810, the message including installation data for automatic installation of the given audio settings 810.

In yet further examples, the method 1000 may further comprise the controller 918, and/or the computing device 799: when the microphonic noise compensation model 802 (e.g. as retrained) fails to compensate for the microphonic noise in at least one of the one or more further audio samples and the audio test set 806: receiving, from the communication device 100, the current audio settings 812 of the communication device 100 at which the microphonic noise occurs; when the microphonic noise compensation model 802 (e.g. as retrained) fails to compensate for the microphonic noise in at least one of the one or more further audio samples and the audio test set 806: determining given audio settings 810 for a respective type of the communication device 100 that reduces or eliminates at least the type of the microphonic noise; and when the current audio settings 812 are different from the given audio settings 810: transmitting, to the communication device 100, a message comprising one or more of: a warning that the current audio settings 812 may be causing the microphonic noise; an indicator of the given audio settings 810 that reduces or eliminates at least the type of the microphonic noise; and installation data for automatic installation of the given audio settings 810. In particular, in these examples, transmission of the aforementioned message may be dependent on the controller 918 and/or the computing device 799 determining that the current audio settings 812 are different from the given settings 812.

The method 1000 may include other features.

In some examples, retraining of the microphonic noise compensation model 802 at the block 1006 may comprise transfer learning, such that only a last one or more layers of the microphonic noise compensation model 802 (e.g. selected at the block 1002) are trained using the one or more audio samples.

For example, when the retraining engine 804 places the microphonic noise compensation model 802 into the training mode, the retraining engine 804 may configure the microphonic noise compensation model 802 in the training mode to change only a last layer, or a given number of last layers of the microphonic noise compensation model 802 to change during the retraining. Such a restriction on retraining of machine learning models may be referred to as transfer learning, and assumes that the layers of a machine learning model, other than the last layer, or a given number of last layers, are sufficiently trained to generally detect given features of input training data, and only the last layer, or a given number of last layers, may be retrained using input training data and output training data, to save processing resources during the retraining. A given number of last layers may be one last layer (e.g. only the last layer), two last layers, three last layers, amongst other possibilities. Indeed, as a machine learning model may comprise tens to hundreds to thousands of layers (e.g. of respective nodes), restricting retraining to only the last layer, or a given number of last layers, may significantly reduce use of processing resources during retraining, as compared to retraining all the layers.

In some examples, the method 1000 may further comprise the controller 918, and/or the computing device 799: determining when the communication device 100 is in an idle state; and deploying (e.g. at the block 1002) the microphonic noise compensation model 802, as retrained, to the communication device 100, only when the communication device 100 is in the idle state.

For example, once the microphonic noise compensation model 802 is retrained, the controller 918, and/or the computing device 799 may communicate with the communication device 100 to inquire when the communication device 100 is in an idle state, and/or request that the communication device 100 provide an indication to the controller 918, and/or the computing device 799 when the communication device 100 is in an idle state. When the communication device 100 is in an idle state, the controller 918, and/or the computing device 799 may deploy (e.g., transmit) the microphonic noise compensation model 802, as retrained, to the communication device 100, and the communication device 100 may replace the current corresponding the microphonic noise compensation model 802 with the received, retrained microphonic noise compensation model 802. It is furthermore understood that the communication device 100 being in an idle state includes a state in which the communication device 100 is not receiving or transmitting audio data and/or voice data, though the communication device 100 may be implementing other types of functionality.

In some examples, the method 1000 may further comprise the controller 918, and/or the computing device 799: receiving, from the communication device 100, the current audio settings 812 of the communication device 100 at which the microphonic noise occurs; receiving, from the other communication devices 800, respective current audio settings at which respective microphonic noise does not occur, or is being compensated for, the communication device 100, and the other communication devices 800, being of a same respective type; using the current audio settings 812 settings (e.g. from the communication device 100) as negative training data to train the settings machine learning model 814 to select or generate the given audio settings 810 that reduces or eliminates at least the type of the microphonic noise for the same respective type of the communication device 100 and the other communication devices 800; and using the respective current audio settings (e.g. from the other communication devices 800) as positive training data to train the machine learning model 814 to select or generate the given audio settings 810 that reduces or eliminates at least the type of the microphonic noise for the same respective type of the communication device 100 and the other communication devices 800.

Furthermore, the controller 918, and/or the computing device 799, may have access to a range of audio settings for the type of the communication device 100 and the other communication devices 800, that may be used as training input when training the settings machine learning model 814. For example, the controller 918, and/or the computing device 799 may have access to a range of volume settings, a range of equalizer settings (e.g. a range of bass settings and/or a range of treble settings, and/or a range of any other suitable frequency settings), and the like over with the current audio settings 812 of the communication device 100 may be adjusted, and such a range and/or ranges may be used as training input whether the current audio settings 812 from the communication device 100 is used as negative training data, or the respective current audio settings 812 from the communication devices 800 is used as positive training data. Such a range of audio settings may be requested from one or more of the communication devices 100, 800, or preconfigured at the computing device 799. As such, the settings machine learning model 814 may be trained to output a combination of given audio settings that may be stored in the given audio settings 810 as audio settings at which microphonic noise is eliminated and/or reduced to below a given amplitude.

Attention is next directed to FIG. 11 to FIG. 17, which depict examples of the method 1000. FIG. 11 to FIG. 17 are substantially similar to FIG. 8, with like components having like numbers. In some of FIG. 11 to FIG. 17, not all components are shown for simplicity, but they may nonetheless be present.

Figure 11:
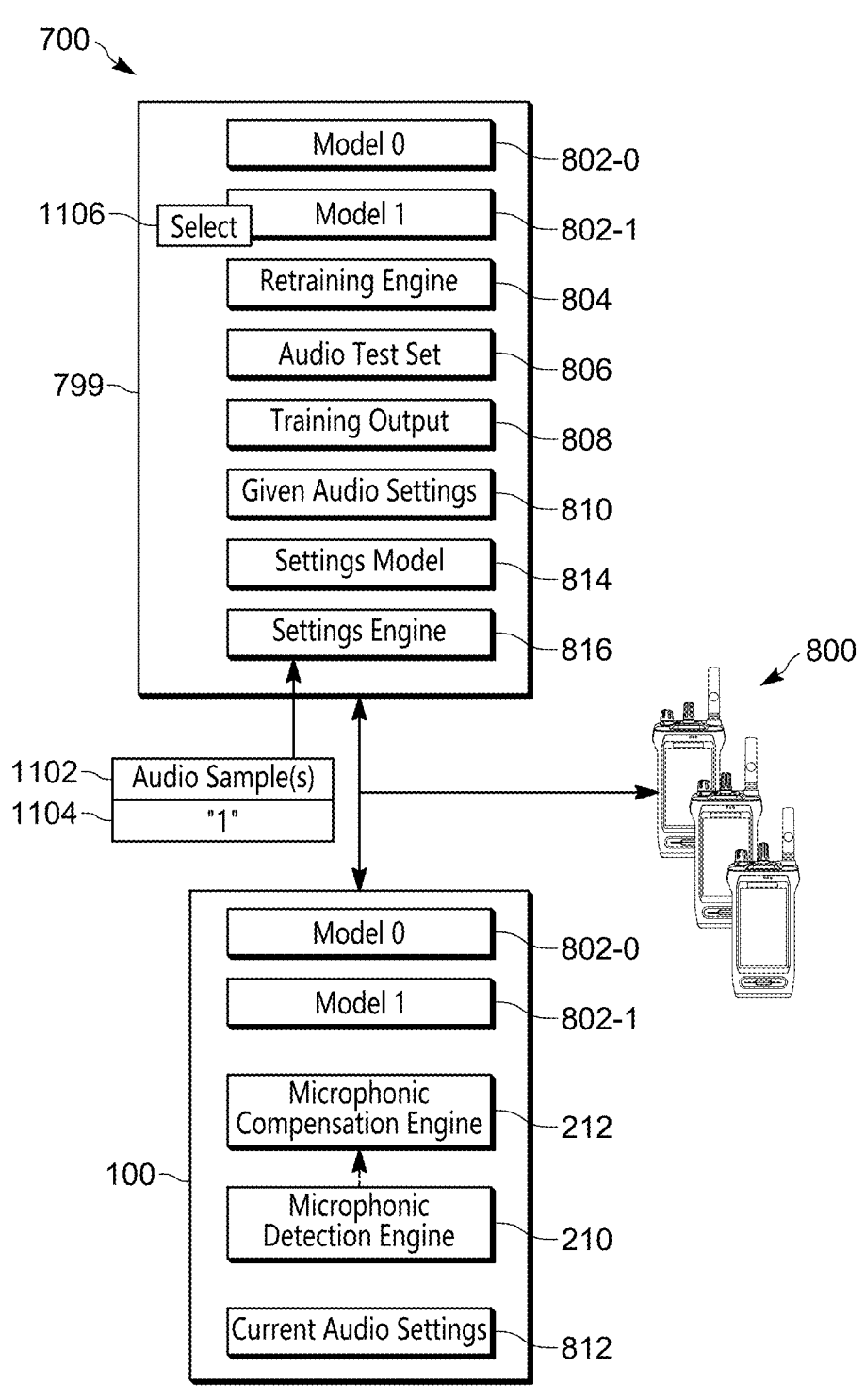
FIG. 11 depicts the system of FIG. 8 implementing a method for retraining a microphonic noise compensation model, in accordance with some examples.

Attention is first directed to FIG. 11, which depicts the communication device 100 providing, to the computing device 799, one or more audio samples 1102, and a microphonic indicator 1104 of "1", indicating a type of microphonic noise present at the one or more audio samples 1102 (e.g. in a range of −6 dB to 0 dB). The computing device 799 receives (e.g. at the block 1002 of the method 1000) the one or more audio samples 1102, and the microphonic indicator 1104 and accordingly selects (e.g. at the block 1004 of the method 1000) the microphonic noise compensation model 802-1 corresponding to the microphonic indicator 1104 of "1", as indicated by the command 1106.

Attention is next directed to FIG. 12, which depicts the retraining engine 804 retraining (e.g. at the block 1006 of the method 1000) the selected microphonic noise compensation model 802-1 in a training mode (e.g. as indicated by the label "Training Mode"), and using the one or more audio samples 1102 that include the microphonic noise as input training data, and the training output 808 as positive output training data mode (e.g. as indicated by the label "Positive"). The retraining engine 804 further controls the selected microphonic noise compensation model 802-1 to retrain only one or more of the last layers via a command 1202 (e.g. and which may initiate transfer learning of the selected microphonic noise compensation model 802-1). Hereafter, to indicate that the selected microphonic noise compensation model 802-1 is retrained, the selected microphonic noise compensation model 802-1, as retrained, will be referred to as the retrained microphonic noise compensation model 802-1R.

Figure 13:
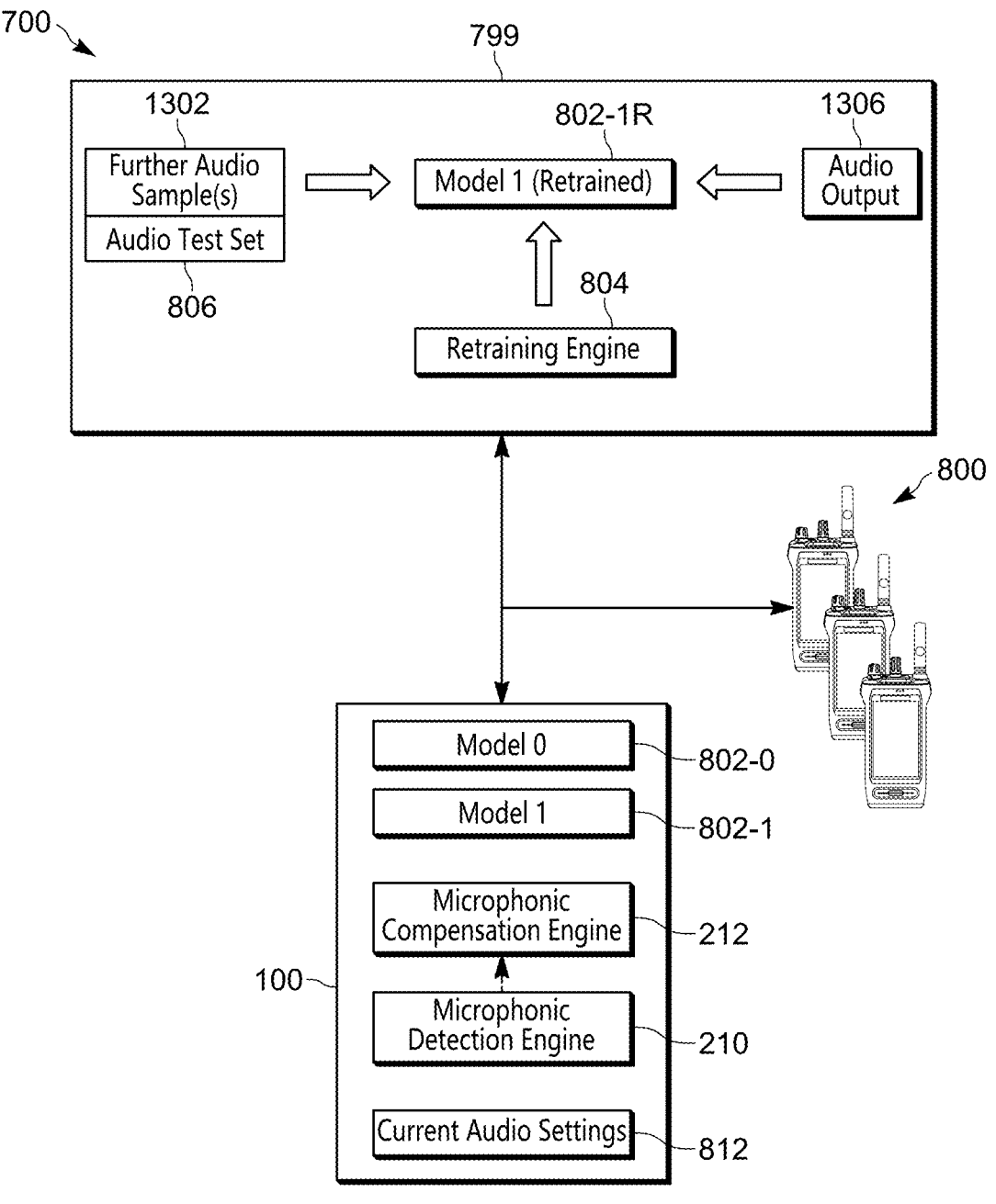
FIG. 13 depicts the system of FIG. 8 continuing to implement a method for retraining a microphonic noise compensation model, in accordance with some examples.

Attention is next directed to FIG. 13, which depicts the retraining engine 804 controlling the retrained microphonic noise compensation model 802-1R into a normal and/or operational mode (e.g. as indicated by the removal of the label "Training Mode", as compared to FIG. 12), and applying the retrained microphonic noise compensation model 802-1R (e.g. at the block 1008 of the method 1000) to one or more further audio samples 1302 and/or at least a portion of the audio test set 806 to generate audio output 1306 used in determining (e.g. at the block 1010 of the method 1000) whether or not the retrained microphonic noise compensation model 802-1R compensates for microphonic noise.

For example, the retraining engine 804 causes one or more further audio samples 1302 and/or at least a portion of the audio test set 806 to be entered as input to the retrained microphonic noise compensation model 802-1R (e.g. at the block 1008 of the method 1000), which generates the audio output 1306.

The one or more further audio samples 1302 may comprise a subset of the audio samples 1102 that were not used as training input data to retrain the selected microphonic noise compensation model 802-1, and/or one or more further audio samples 1302 may be received before or after the audio samples 1102 used a training input data; regardless the one or more further audio samples 1302 are understood to include a same type of microphonic noise as the audio samples 1102 used to retrain the selected microphonic noise compensation model 802-1. Furthermore, the portion of the audio test set 806 used as input is understood to include a same type of microphonic noise as the audio samples 1102 used retrain the selected microphonic noise compensation model 802-1, and/or the further audio samples 1302.

Figure 14:
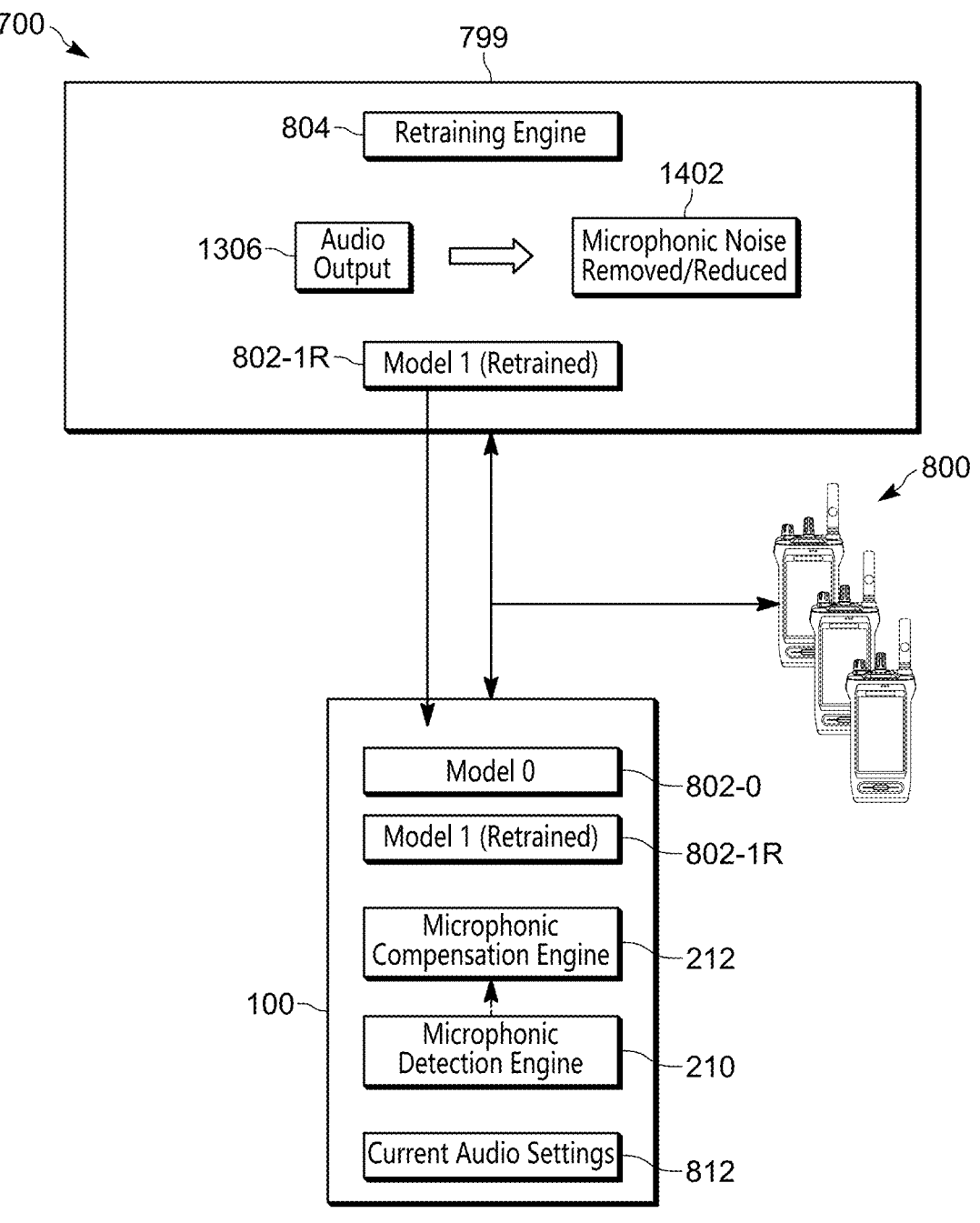
FIG. 14 depicts the system of FIG. 8 continuing to implement a method for retraining a microphonic noise compensation model, in accordance with some examples.

Attention is next directed to FIG. 14, which depicts an example of a "YES" decision at the block 1010 of the method 1000 and the block 1012 of the method 1000. In particular, in FIG. 14, the computing device 799 and/or the retraining engine 804 may analyze the audio output 1306 and determine 1402 that the microphonic noise was removed from the one or more further audio samples 1302 and/or the portion of the audio test set 806 used as input to the retrained microphonic noise compensation model 802-1R. For example the computing device 799 and/or the retraining engine 804 may analyze the audio output 1306 and determine 1402 that the audio output 1306 is absent of microphonic noise and/or that the microphonic noise has been reduced to below a given amplitude (e.g. a "YES" decision at the block 1008 of the method 1000). As such, the computing device 799 transmits and/or provides (e.g. at the block 1010 of the method 1000), to the communication device 100, the retrained microphonic noise compensation model 802-1R. The communication device 100 receives the retrained microphonic noise compensation model 802-1R and replaces the microphonic noise compensation model 802-1 with the retrained microphonic noise compensation model 802-1R. Hence, thereafter, when the communication device 100 and/or the microphonic detection engine 210 detects microphonic noise of a type corresponding to the microphonic indicator 1104 (e.g., a flag of "1") in received audio, the microphonic compensation engine 212 may use the retrained microphonic noise compensation model 802-1R to compensate for the microphonic noise.

As such, and again returning to the method 300, rather than reduce volume of the communication device 100 at the block 322, the retrained microphonic noise compensation model 802-1R may be installed at the communication device 100 and used by the microphonic compensation engine 212 to compensate for microphonic noise corresponding to the type indicated by the microphonic indicator 1104 of "1".

While not depicted, the computing device 799 may communicate with the communication device 100 to determine when the communication device 100 is in idle state, and transmit and/or provide the retrained microphonic noise compensation model 802-1R to the communication device 100 only when the communication device 100 is in idle state.

Figure 15:
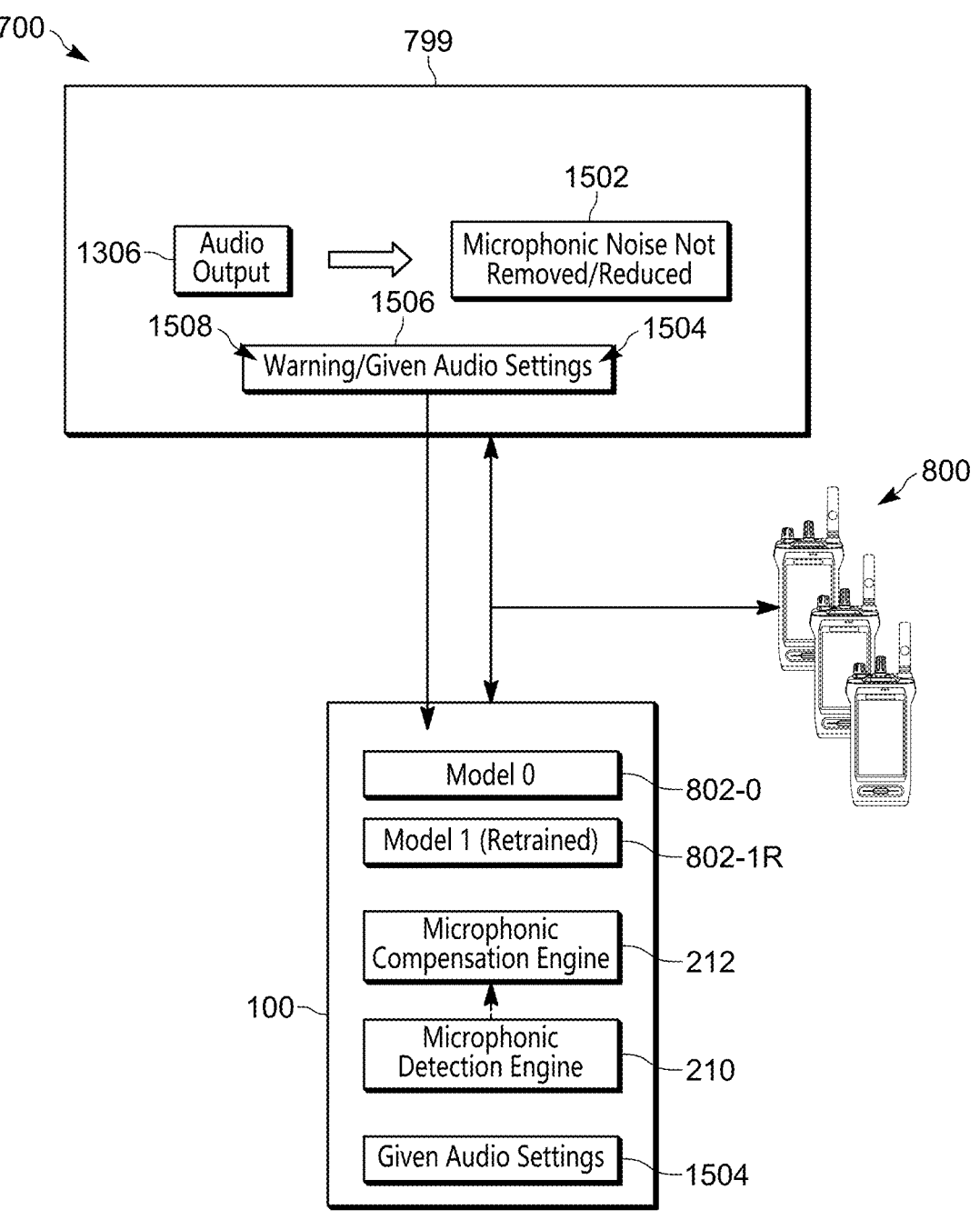
FIG. 15 depicts the system of FIG. 8 continuing to implement a method for retraining a microphonic noise compensation model, in accordance with some examples.

Attention is next directed to FIG. 15, which depicts an example of a "NO" decision at the block 1010 of the method 1000 and the blocks 1014, 1016, 1018 of the method 1000. In particular, in FIG. 14, the computing device 799 and/or the retraining engine 804 may analyze the audio output 1306 and determine 1502 that the microphonic noise was not removed from the one or more further audio samples 1302 and/or the portion of the audio test set 806 used as input to the retrained microphonic noise compensation model 802-1R. For example the computing device 799 and/or the retraining engine 804 may analyze the audio output 1306 and determine that the audio output 1306 continues to include microphonic noise and/or that the microphonic noise remains above a given amplitude (e.g. a "NO" decision at the block 1010 of the method 1000).

As such, the computing device 799 does not (e.g. at the block 1014 of the method 1000) deploy the retrained microphonic noise compensation model 802-1R to the communication device 100, for example as the retraining of the microphonic noise compensation model 802-1 did not result in the retrained microphonic noise compensation model 802-1R sufficiently compensating for the microphonic noise.

Rather, the computing device 799 may determine (e.g. at the block 1016 of the method 1000) given audio settings 1504 (e.g. that may comprise a subset of the given audio settings 810) for a respective type of the communication device 100 that reduces or eliminates at least the type of the microphonic noise indicated by the microphonic indicator 1104. Furthermore, the computing device 799 may generate a message 1506 that includes a warning 1508 that the current audio settings 812 of the communication device 100 may be causing the microphonic noise and/or an indication of the given audio settings 1504, and transmit (e.g. at the block 1018 of the method 1000), the message to the communication device 100. In some examples, as depicted, the message 1506 may automatically cause the current audio settings 812 to be replaced with the given audio settings 1504.

As such, and again returning to the method 300, rather than strictly reducing volume of the communication device 100 at the block 322, the communication device 100 may receive the message 1506 and change the current audio settings 812 to the given audio settings 1504, which may include, but is not limited to, reducing the volume of the communication device 100, and/or changing any other suitable equalizer settings, and the like, indicated by the given audio settings 1504.

While not depicted, the computing device 799 may communicate with the communication device 100 to determine when the communication device 100 is in idle state, and transmit and/or provide the message 1506 to the communication device 100 only when the communication device 100 is in idle state.

Figure 16:
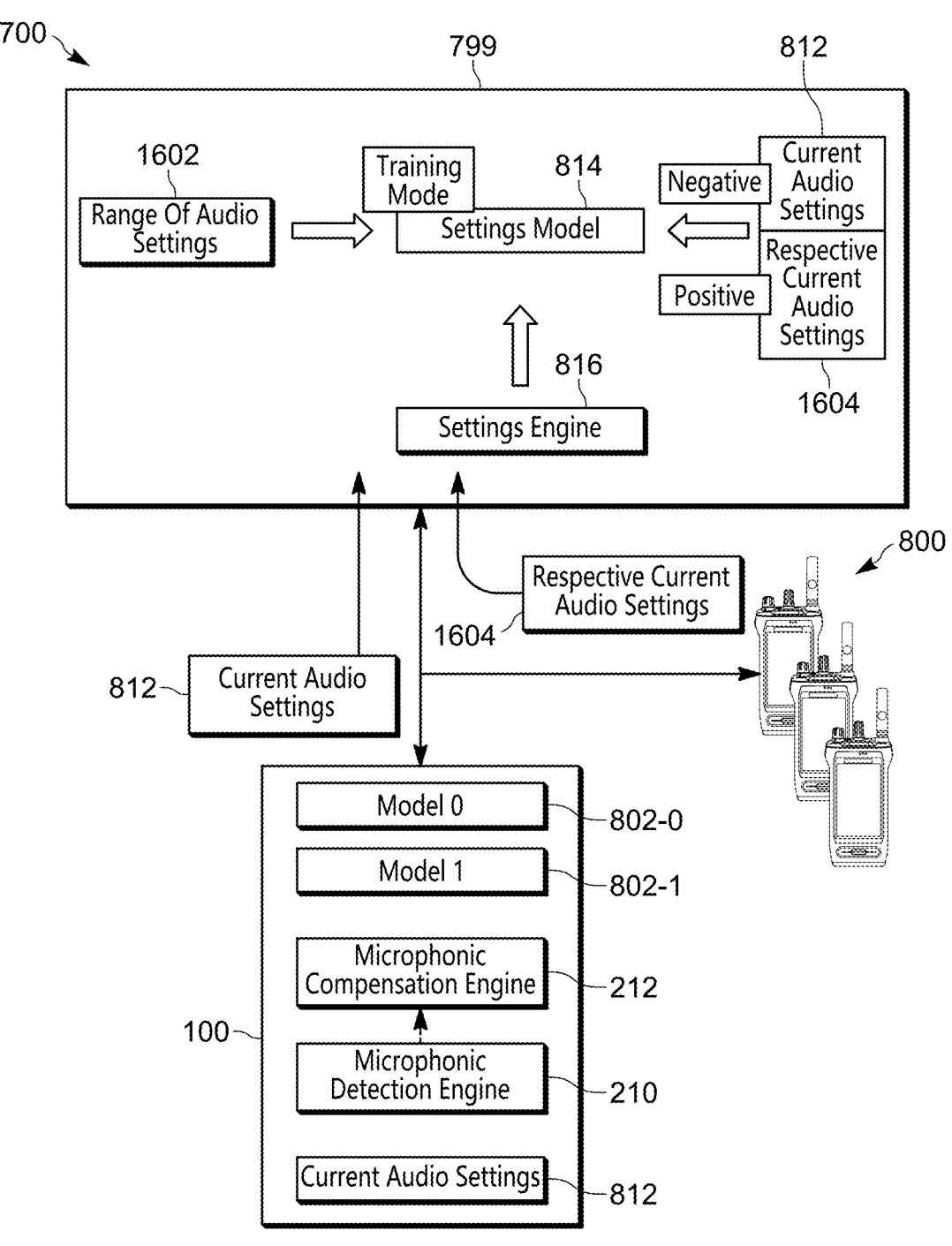
FIG. 16 depicts the system of FIG. 8 continuing to implement a method for retraining a microphonic noise compensation model, in accordance with some examples.

Attention is next directed to FIG. 16, which depicts the settings engine 816 training the settings model 814 in a training mode (e.g., indicated via a label "Training Mode"), and using a range of audio settings 1602 available for the communication device 100 as training input. The settings engine 816 further used the current audio settings 812 of the communication device 100, at which microphonic noise occurs, as negative training output (e.g., indicated via a label "Negative"), and respective current audio settings 1604 of the other communication devices 800 at which microphonic noise does not occur (or is being successfully compensated for) as positive training output (e.g., indicated via a label "Positive").

While FIG. 16 depicts the current audio settings 812 and the respective current audio settings 1604 being used simultaneously to train the settings model 814, it is understood that the current audio settings 812 and the respective current audio settings 1604 may be used sequentially.

FIG. 16 further depicts the communication device 100 and the other communication devices 800 respectively providing the current audio settings 812 and the respective current audio settings 1604 to the computing device 799. For example, the computing device 799, upon implementing the method 1000 and determining at the block 1010 that the retrained microphonic noise compensation model 802-1R is not compensating for microphonic noise (e.g. a "NO" decision at the block 1010 of the method 1000), may request the current audio settings 812 from the communication device 100, and request the respective current audio settings 1604 from a subset of the other communication devices 800 at which microphonic noise is not occurring (or is being successfully compensated for), and train the settings model 814 accordingly.

Alternatively, or in addition, the setting model 814 may be trained at any suitable time, before, during or after implementation of the method 1000, using only the respective current audio settings 1604 as positive training data.

Furthermore, the range of audio settings 1602 may be preconfigured at the computing device 799, and/or requested from one or more of the communication devices 100, 800.

Figure 17:
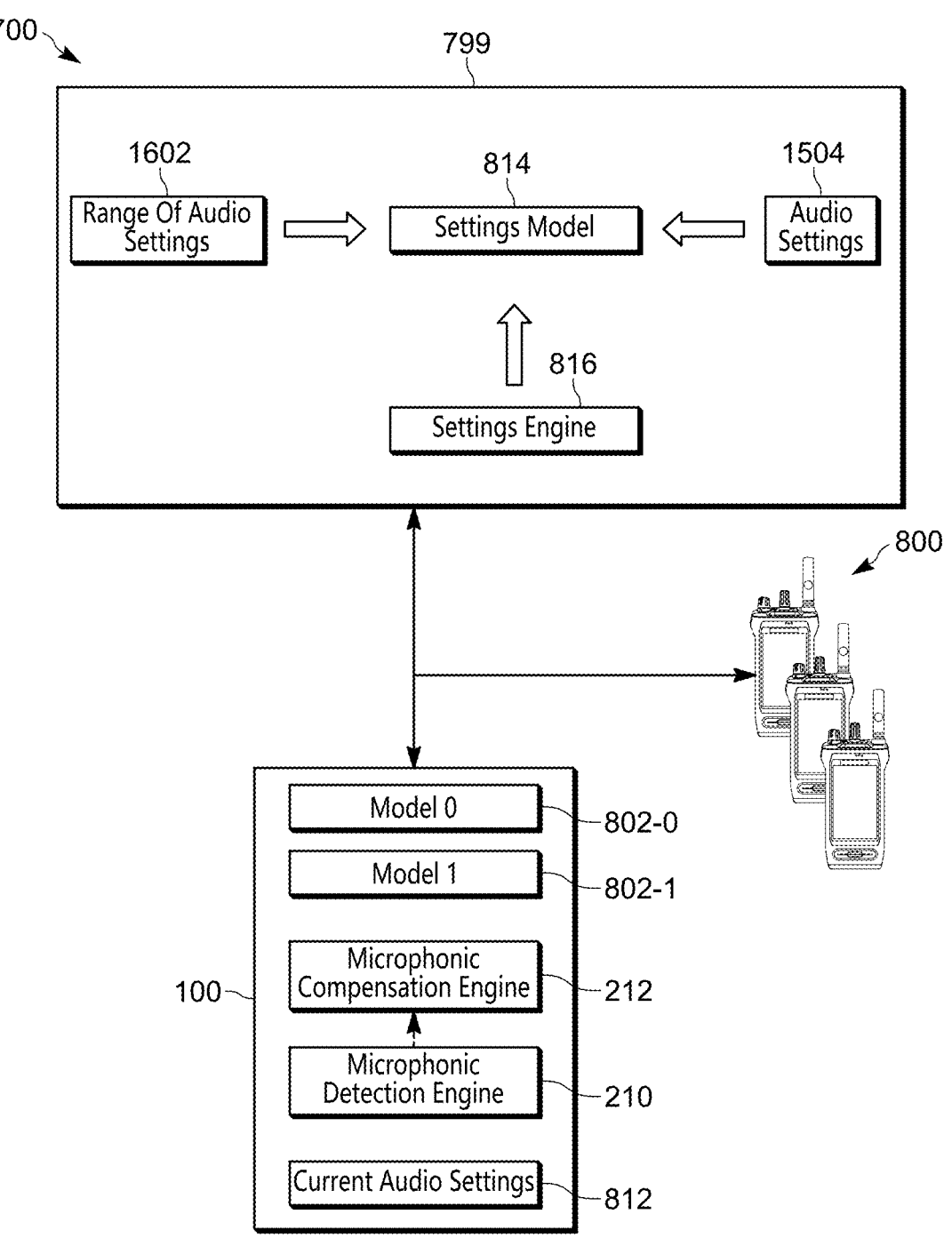
FIG. 17 depicts the system of FIG. 8 continuing to implement a method for retraining a microphonic noise compensation model, in accordance with some examples.

Attention is next directed to FIG. 17, which depicts the settings engine 816 controlling the trained settings model 814 into a normal and/or operational mode (e.g. as indicated by the removal of the label "Training Mode", as compared to FIG. 16), to generate the audio settings 1504, that are provided to the communication device 100 as depicted in FIG. 15. Indeed, at least FIG. 17 may comprise an example of the block 1016 of the method 1000.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, cannot train a machine learning model, cannot compensate for microphonic noise in a feedback loop, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, at a computing device, from a communication device at which microphonic noise is occurring: a microphonic indicator indicating a type of the microphonic noise; and one or more audio samples that include the microphonic noise;
selecting, via the computing device, using the microphonic indicator, a microphonic noise compensation model pretrained for compensating for the type of the microphonic noise;
retraining, via the computing device, using the one or more audio samples that include the microphonic noise, the microphonic noise compensation model to compensate for the type of the microphonic noise;
applying, via the computing device, the microphonic noise compensation model, as retrained, to at least one of: one or more further audio samples received from the communication device that include the microphonic noise; and an audio test set that includes the type of the microphonic noise; and
when the microphonic noise compensation model compensates for the microphonic noise in at least one of the one or more further audio samples and the audio test set, deploying, via the computing device, the microphonic noise compensation model, as retrained, to the communication device.

2. The method of claim 1, further comprising:
selecting one or more particular audio samples, from the one or more audio samples, that exclude voice data; and
performing the retraining of the microphonic noise compensation model using the one or more particular audio samples that exclude the voice data.

3. The method of claim 1, wherein the retraining of the microphonic noise compensation model comprises transfer learning, such that only a last one or more layers of the microphonic noise compensation model are trained using the one or more audio samples.

4. The method of claim 1, further comprising:
determining when the communication device is in an idle state; and
deploying the microphonic noise compensation model, as retrained, to the communication device only when the communication device is in the idle state.

5. The method of claim 1, wherein the microphonic noise is of a first type or a second type, and the microphonic indicator indicates the first type or the second type.

6. The method of claim 1, wherein the microphonic noise compensation model is one of a plurality of microphonic noise compensation models, the plurality of microphonic noise compensation models pretrained to compensate for different respective types of the microphonic noise.

7. The method of claim 1, further comprising:
when the microphonic noise compensation model fails to compensate for the microphonic noise in at least one of the one or more further audio samples and the audio test set: determining given audio settings for a respective type of the communication device that reduces or eliminates at least the type of the microphonic noise; and transmitting, to the communication device, a message comprising a warning that current audio settings of the communication device may be causing the microphonic noise.

8. The method of claim 1, further comprising:

when the microphonic noise compensation model fails to compensate for the microphonic noise in at least one of the one or more further audio samples and the audio test set: determining given audio settings for a respective type of the communication device that reduces or eliminates at least the type of the microphonic noise; and transmitting, to the communication device, a message indicating the given audio settings, the message including installation data for automatic installation of the given audio settings.

9. The method of claim 1, further comprising:

receiving, from the communication device, current audio settings of the communication device at which the microphonic noise occurs;

when the microphonic noise compensation model fails to compensate for the microphonic noise in at least one of the one or more further audio samples and the audio test set: determining given audio settings for a respective type of the communication device that reduces or eliminates at least the type of the microphonic noise; and when the current audio settings are different from the given audio settings: transmitting, to the communication device, a message comprising one or more of:

a warning that the current audio settings may be causing the microphonic noise;

an indicator of the given audio settings that reduces or eliminates at least the type of the microphonic noise; and installation data for automatic installation of the given audio settings.

10. The method of claim 1, further comprising:

receiving, from the communication device, current audio settings of the communication device at which the microphonic noise occurs;

receiving, from other communication devices, respective current audio settings at which respective microphonic noise does not occur, or is being compensated for, the communication device, and the other communication devices, being of a same respective type;

using the current audio settings as negative training data to train a machine learning model to select given audio settings that reduces or eliminates at least the type of the microphonic noise for the same respective type of the communication device and the other communication devices; and using the respective current audio settings as positive training data to train the machine learning model to select the given audio settings that reduces or eliminates at least the type of the microphonic noise for the same respective type of the communication device and the other communication devices.

11. A computing device comprising:

a communication interface;

a controller; and a computer-readable storage medium having stored thereon program instructions that, when executed by the controller, cause the controller to perform a set of operations comprising:

receiving, via the communication interface, from a communication device at which microphonic noise is occurring: a microphonic indicator indicating a type of the microphonic noise; and one or more audio samples that include the microphonic noise;

selecting, using the microphonic indicator, a microphonic noise compensation model pretrained for compensating for the type of the microphonic noise;

retraining, using the one or more audio samples that include the microphonic noise, the microphonic noise compensation model to compensate for the type of the microphonic noise;

applying, the microphonic noise compensation model, as retrained, to at least one of: one or more further audio samples received from the communication device that include the microphonic noise; and an audio test set that includes the type of the microphonic noise; and when the microphonic noise compensation model compensates for the microphonic noise in at least one of the one or more further audio samples and the audio test set, deploying, via the communication interface, the microphonic noise compensation model, as retrained, to the communication device.

12. The computing device of claim 11, wherein the set of operations further comprises:

selecting one or more particular audio samples, from the one or more audio samples, that exclude voice data; and performing the retraining of the microphonic noise compensation model using the one or more particular audio samples that exclude the voice data.

13. The computing device of claim 11, wherein the retraining of the microphonic noise compensation model comprises transfer learning, such that only a last one or more layers of the microphonic noise compensation model are trained using the one or more audio samples.

14. The computing device of claim 11, wherein the set of operations further comprises:

determining when the communication device is in an idle state; and deploying the microphonic noise compensation model, as retrained, to the communication device only when the communication device is in the idle state.

15. The computing device of claim 11, wherein the microphonic noise is of a first type or a second type, and the microphonic indicator indicates the first type or the second type.

16. The computing device of claim 11, wherein the microphonic noise compensation model is one of a plurality of microphonic noise compensation models, the plurality of microphonic noise compensation models pretrained to compensate for different respective types of the microphonic noise.

17. The computing device of claim 11, wherein the set of operations further comprises:

when the microphonic noise compensation model fails to compensate for the microphonic noise in at least one of the one or more further audio samples and the audio test set: determining given audio settings for a respective type of the communication device that reduces or eliminates at least the type of the microphonic noise; and transmitting, to the communication device, a message comprising a warning that current audio settings of the communication device may be causing the microphonic noise.

18. The computing device of claim 11, wherein the set of operations further comprises:

when the microphonic noise compensation model fails to compensate for the microphonic noise in at least one of the one or more further audio samples and the audio test set: determining given audio settings for a respective type of the communication device that reduces or eliminates at least the type of the microphonic noise; and transmitting, to the communication device, a message indicating the given audio settings, the message including installation data for automatic installation of the given audio settings.

19. The computing device of claim 11, wherein the set of operations further comprises:

receiving, from the communication device, current audio settings of the communication device at which the microphonic noise occurs;

when the microphonic noise compensation model fails to compensate for the microphonic noise in at least one of the one or more further audio samples and the audio test set: determining given audio settings for a respective type of the communication device that reduces or eliminates at least the type of the microphonic noise; and when the current audio settings are different from the given audio settings: transmitting, to the communication device, a message comprising one or more of:

a warning that the current audio settings may be causing the microphonic noise;

an indicator of the given audio settings that reduces or eliminates at least the type of the microphonic noise; and installation data for automatic installation of the given audio settings.

20. The computing device of claim 11, wherein the set of operations further comprises:

receiving, from the communication device, current audio settings of the communication device at which the microphonic noise occurs;

receiving, from other communication devices, respective current audio settings at which respective microphonic noise does not occur, or is being compensated for, the communication device, and the other communication devices, being of a same respective type;

using the current audio settings as negative training data to train a machine learning model to select given audio settings that reduces or eliminates at least the type of the microphonic noise for the same respective type of the communication device and the other communication devices; and using the respective current audio settings as positive training data to train the machine learning model to select the given audio settings that reduces or eliminates at least the type of the microphonic noise for the same respective type of the communication device and the other communication devices.

* * * * *